(12) United States Patent
Bae

(10) Patent No.: US 11,740,329 B2
(45) Date of Patent: *Aug. 29, 2023

(54) RADAR SENSOR FOR VEHICLE AND METHOD FOR ASSEMBLING THE SAME

(71) Applicant: HYUNDAI MOBIS CO., LTD., Seoul (KR)

(72) Inventor: Sang Hee Bae, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,625

(22) Filed: Oct. 21, 2021

(65) Prior Publication Data

US 2022/0043122 A1  Feb. 10, 2022

Related U.S. Application Data

(63) Continuation of application No. 16/814,760, filed on Mar. 10, 2020, now Pat. No. 11,181,620.

(30) Foreign Application Priority Data

Mar. 11, 2019 (KR) .................. 10-2019-0027564
Jun. 26, 2019 (KR) .................. 10-2019-0076174

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
CPC ...... G01S 7/4813; G01S 17/931; G01S 7/027; G01S 13/931; G01S 7/02; H05K 7/2039
See application file for complete search history.

(56) References Cited

U.S. PATENT DOCUMENTS 10,492,334 B2  11/2019  Woodcock
10,914,830 B2  2/2021  Vacanti
(Continued)

FOREIGN PATENT DOCUMENTS

CN  101242735  8/2008
CN  105143911  12/2015
(Continued)

OTHER PUBLICATIONS

Chinese Office Action dated May 20, 2023 issued in CN 202010163008.

*Primary Examiner* — Seung C Sohn
(74) *Attorney, Agent, or Firm* — DLA Piper LLP (US)

(57) ABSTRACT

A radar sensor for a vehicle may include: a cover configured to transmit electromagnetic waves; a measurement unit disposed at a position facing the cover, and configured to generate the electromagnetic waves to sense an object; a housing having an internal space in which the measurement unit is disposed, and including an open entrance at which the cover is installed; a shield case coupled to the measurement unit, and configured to block the electromagnetic waves generated by the measurement unit such that the electromagnetic waves are discharged to the entrance; and one or more heat conductors disposed between the measurement unit and the shield case and between the shield case and the housing, and configured to conduct heat, generated by the measurement unit, from the shield case to the housing such that the heat is discharged to the outside of the housing.

15 Claims, 35 Drawing Sheets

(56) References Cited

U.S. PATENT DOCUMENTS 11,129,312 B2 * 9/2021 Grinsteinner ........ H05K 9/0047
11,181,620 B2 * 11/2021 Bae ...................... G01S 7/4813

FOREIGN PATENT DOCUMENTS

CN          206074806        4/2017
KR     10-2019-0058072       5/2019

* cited by examiner

RADAR SENSOR FOR VEHICLE AND METHOD FOR ASSEMBLING THE SAME

CROSS-REFERENCE TO RELATED APPLICATION

The present application is a continuation of U.S. application Ser. No. 16/814,760, filed Mar. 10, 2020, which claims priority under 35 U.S.C. § 119(a) to Korean Patent Application No. 10-2019-0027564, filed Mar. 11, 2019 and Korean Patent Application No. 10-2019-0076174, filed Jun. 26, 2019. The contents of the aforementioned patent applications are hereby expressly incorporated by reference in their entirety for all purposes.

BACKGROUND

Technical Field

Embodiments of the present disclosure relate to a radar sensor for a vehicle and a method for assembling the same, and more particularly, to a radar sensor for a vehicle, which can lower internal temperature, and a method for assembling the same.

Related Art

In general, an apparatus is developed, which recognizes a pedestrian ahead of a vehicle, and warns a driver or automatically performs braking or steering control when a collision is likely to occur, thereby avoiding a collision. A forward object recognition apparatus includes a radar sensor capable of sensing a distance to a target around a vehicle and the direction, speed, temperature and material of the target, in order to recognize the target. The radar sensor may emit light to the target and receive information of the target through light reflected from the target. However, the internal temperature of the radar sensor may rise up to 170 degrees due to heat generated from a radar semiconductor of the radar sensor, and the performance of the radar sensor may be degraded. Therefore, there is a need for a device capable of solving the problem.

The related art of the present disclosure is disclosed in Korean Patent Application Laid-Open No. 10-2019-0058072 published on May 29, 2019 and entitled "Radar Sensor for Vehicle".

SUMMARY

Various embodiments are directed to a radar sensor for a vehicle, which can lower internal temperature, and a method for assembling the same.

Also, various embodiments are directed to a radar sensor for a vehicle, which can sense an object using electromagnetic waves generated by a radar semiconductor.

In an embodiment, a radar sensor for a vehicle may include: a cover configured to transmit electromagnetic waves; a measurement unit disposed at a position facing the cover, and configured to generate the electromagnetic waves to sense an object; a housing having an internal space in which the measurement unit is disposed, and including an open entrance at which the cover is installed; a shield case coupled to the measurement unit, and configured to block the electromagnetic waves generated by the measurement unit such that the electromagnetic waves are discharged to the entrance; and one or more heat conductors disposed between the measurement unit and the shield case and between the shield case and the housing, and configured to conduct heat, generated by the measurement unit, from the shield case to the housing such that the heat is discharged to the outside of the housing.

The one or more heat conductors may include: a first heat conductor member disposed between the measurement unit and the shield case so as to be coupled to the measurement unit and the shield case, and configured to conduct the heat, generated by the measurement unit, from the shield case; and a second heat conductor member disposed between the shield case and the housing so as to be coupled to the shield case and the housing, and configured to conduct the heat, conducted from the shield case, to the housing.

The measurement unit may include: a board facing the cover, and having the first heat conductor coupled thereto; and a radar semiconductor installed on the board, and configured to generate the electromagnetic waves to sense an object.

The shield case may include: a clip coupled to a surface of the board, facing the housing; and a shield case body fitted and coupled to the clip and having the first heat conductor member coupled to a surface thereof, facing the measurement unit.

The housing may include a coupling part having a coupling groove to which the second heat conductor member is coupled.

The heat conductor may include a curable paste material.

In an embodiment, a method for assembling a radar sensor may include: a first assembling step of applying a first heat conductor member onto a measurement unit, and coupling a shield case to the measurement unit; a second assembling step of applying a second heat conductor member onto the housing, and coupling the measurement unit to a housing; and a third assembling step of coupling a cover to the housing.

The first and second heat conductor members may include a curable paste material.

The first assembling step may include: a clip coupling step of coupling a clip of the shield case to a board of the measurement unit; a first heat conductor member applying step of applying the first heat conductor member onto the board; and a shield case body coupling step of bringing the shield case body into contact with the first heat conductor member by fitting and coupling a shield case body of the shield case to the clip.

In the shield case body coupling step, the first heat conductor member may be pressed between the board and the shield case body, and coupled as one body with the board and the shield case body while being naturally cured.

In the second assembling step, the second heat conductor member may be applied onto a coupling part of the housing, pressed between the housing and the shield case, and coupled as one body with the housing and the shield case while being naturally cured.

The coupling part may have a coupling groove, and the second heat conductor member may be applied into the coupling groove.

In an embodiment, a radar sensor for a vehicle may include: a cover configured to transmit electromagnetic waves; a measurement unit installed at a position facing the cover, and configured to generate the electromagnetic waves to sense an object; a shield case installed at a position facing the cover with the measurement unit interposed therebetween, and configured to block the electromagnetic waves generated by the measurement unit; and a housing having an internal space in which the shield case and the measurement unit are installed, and including an open entrance at which the cover is installed.

The measurement unit may include: a board fixed to the inside of the housing so as to be separated from the cover; and a radar semiconductor installed on the board, and configured to generate the electromagnetic waves to sense an object.

A set area in which no elements are disposed may be located on one side of the board, where the radar semiconductor is located.

The cover may include: a plate-shaped cover body covering the entrance; an inner member protruding from the cover body so as to be located inside the housing; and an outer member protruding from the cover body so as to be located outside the housing.

The cover may further include a movement prevention protrusion protruding from the outer member or the inner member facing the housing and abutting on the housing.

The housing may include: a housing body having the shield case and the measurement unit located therein and coupled to the cover; and a connector body extended from the housing body and having a connector pin installed therein.

The housing body may include a plate-shaped base part facing the measurement unit; a first sidewall part extended from the edge of the base part and forming a space in which the shield case is seated; a second sidewall part extended from the first sidewall part, such that the inside thereof faces the edge of the measurement unit and ends thereof face the inner member and the outer member; and a protrusion extended from the second sidewall part and located between the inner member and the outer member.

The measurement unit may be seated on the upper portion of the first sidewall part, and the connector pin has one side located in the connector body and the other side protruding upward from the first sidewall part so as to be connected to the measurement unit.

The housing body may include: a support body part protruding to the inside of the first and second sidewall parts and extended in the coupling direction of the measurement unit; and a side fixing part protruding from the support body part so as to support the bottom of the measurement unit.

The shield case may be located in the housing, and have a shield space concave toward the measurement unit.

The radar sensor may further include a holder installed in a shape to cover the outside of the housing, and fixed to a vehicle body.

The holder may include a first holder body covering the outside of the housing; and a hook protrusion protruding from the first holder body and locked to a side surface of the housing.

The holder may include a second holder body installed in a shape to cover the side surface of the housing; and a coupling hole formed at a side surface of the second holder body, facing the side surface of the housing, and a locking protrusion formed on the side surface of the housing is inserted and fixed to the coupling hole.

In accordance with the embodiments of the present disclosure, the radar sensor may include the heat conductors disposed between the measurement unit and the shield case and between the shield case and the housing, respectively, so as to be contacted with the measurement unit, the shield case and the housing. Thus, the temperature of the radar sensor may be lowered while heat generated by the measurement unit is conducted to the housing through the shield case and then discharged to the outside.

Furthermore, the first and second heat conductor members made of a curable paste material may be applied between the measurement unit and the shield case and between the shield case and the housing, and reliably coupled as one body with the measurement unit, the shield case and the housing while being naturally cured.

Furthermore, since the shield case includes a clip coupled to the measurement unit and a shield case body fitted and coupled to the clip, the shield case may be easily coupled to the measurement unit, which makes it possible to facilitate the assembling process.

Furthermore, since the radar sensor senses an object using electromagnetic waves generated by the radar semiconductor, the accuracy of measurement can be improved, compared to ultrasonic measurement.

Furthermore, the board may be inserted onto the connector pin and provisionally assembled. Then, the board may be contacted with the upper portion of the first sidewall part and completely assembled. Thus, the board may be stably fixed.

DETAILED DESCRIPTION

Figure 1:
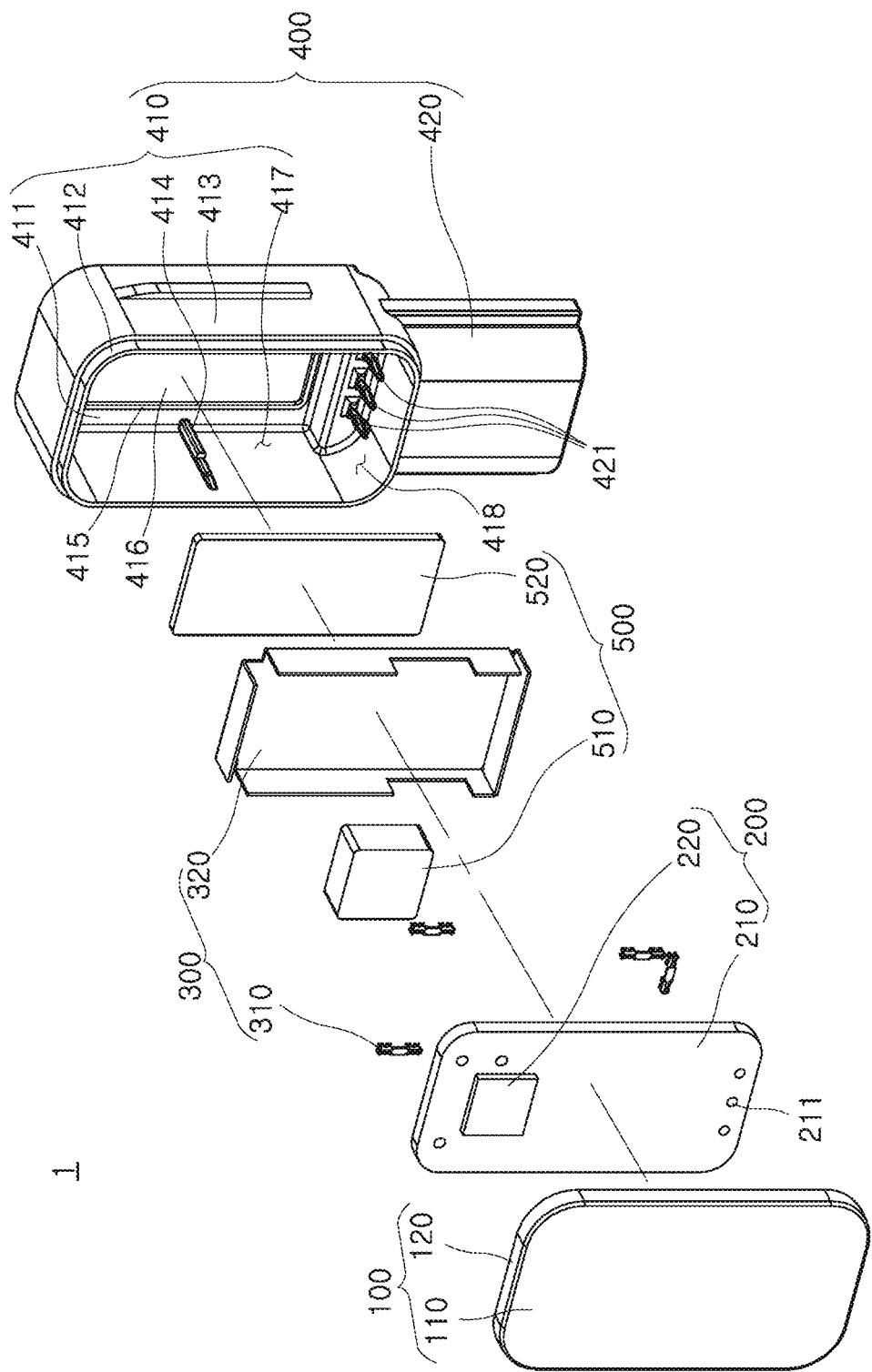
FIG. 1 is an exploded perspective view of a radar sensor for a vehicle in accordance with an embodiment of the present disclosure.
Figure 2:
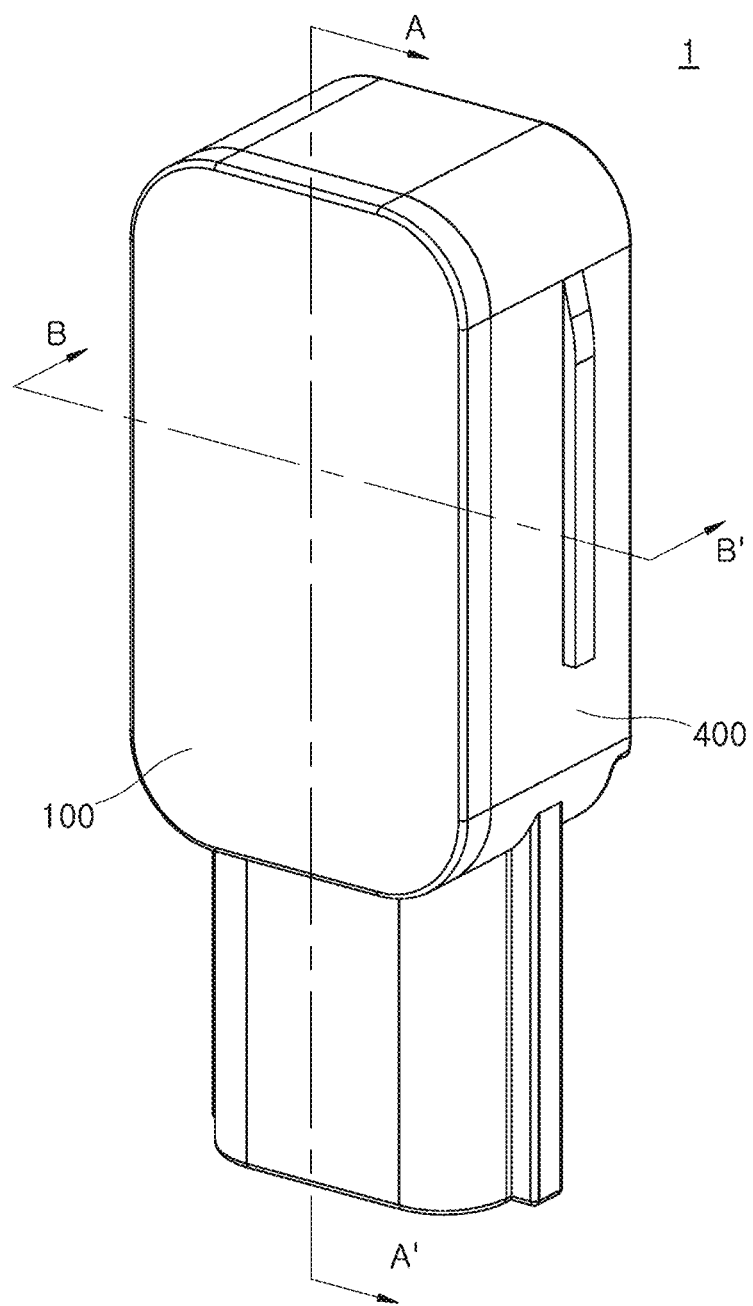
FIG. 2 is a perspective view of the radar sensor for a vehicle in accordance with the embodiment of the present disclosure.
Figure 3:
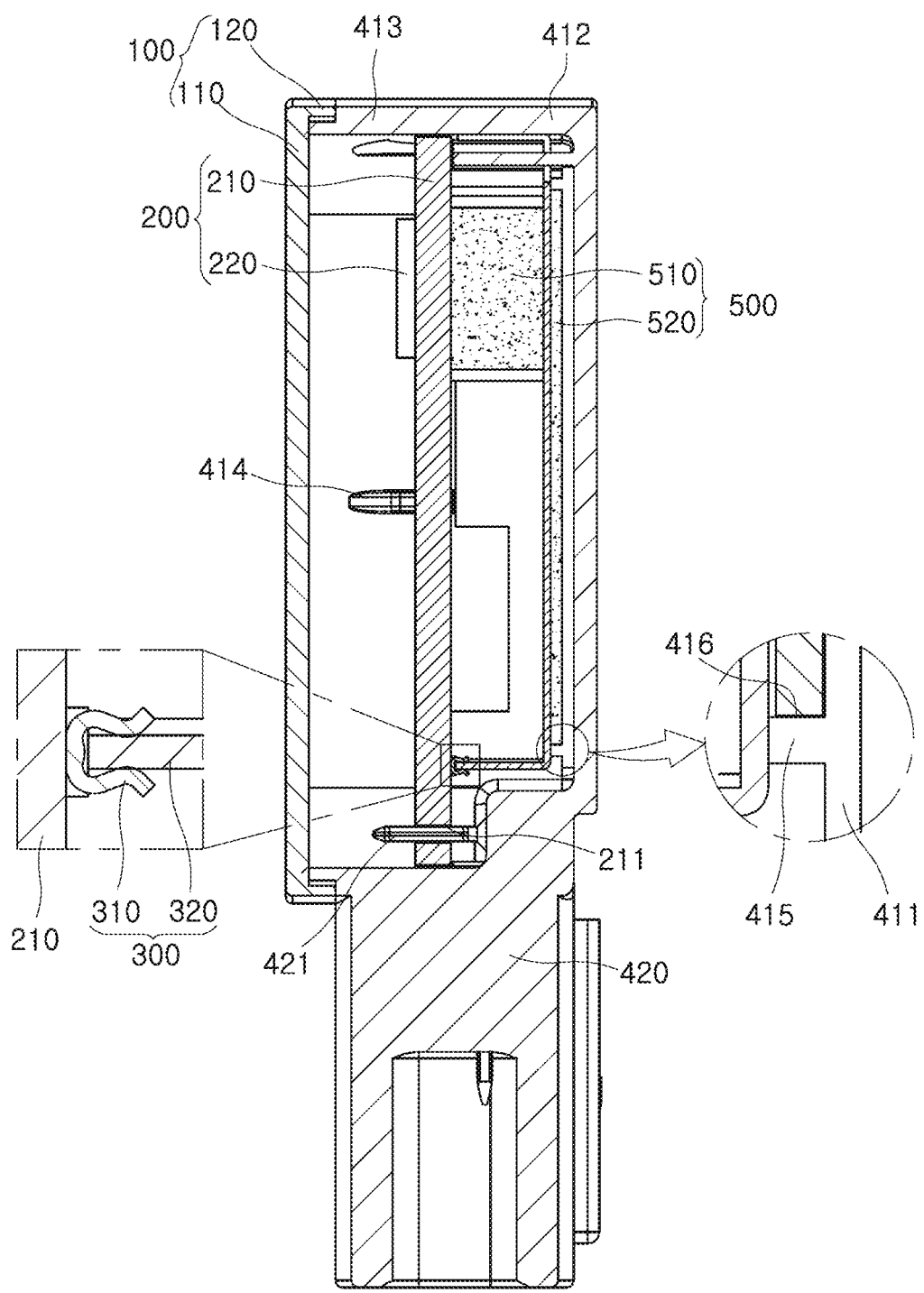
FIG. 3 is a cross-sectional view taken along the line A-A' of FIG. 2.
Figure 4:
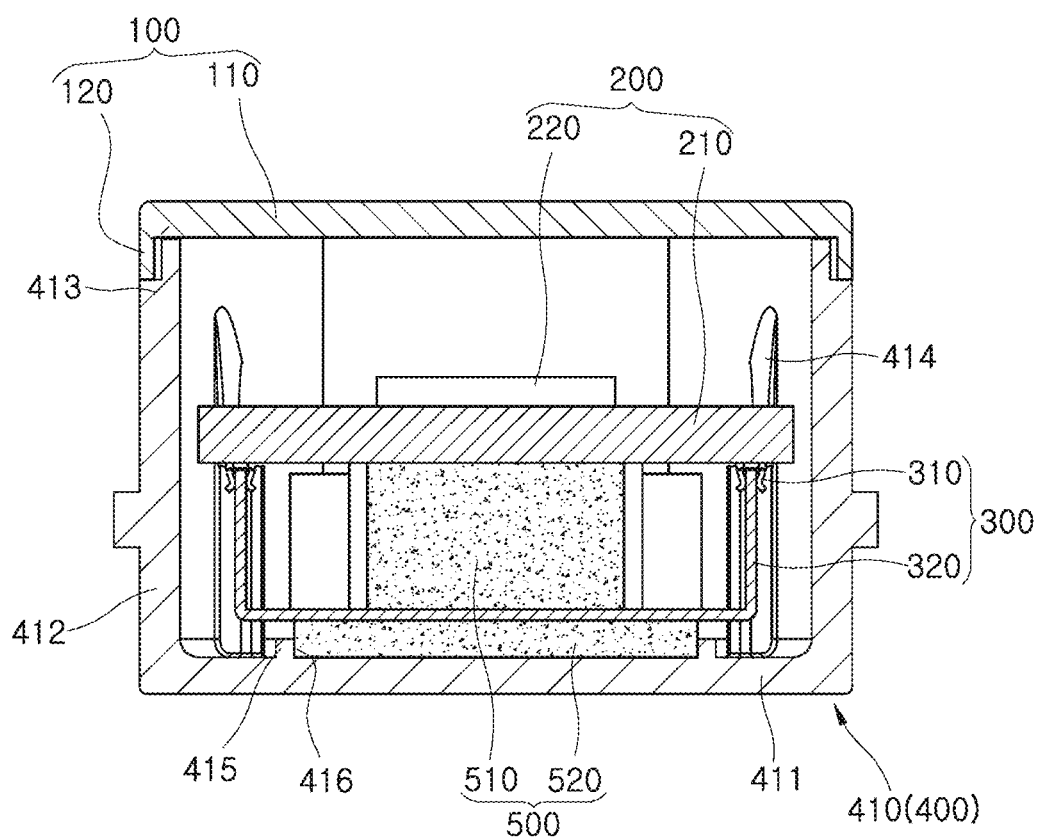
FIG. 4 is a cross-sectional view taken along the line B-B' of FIG. 2.

Hereinafter, a radar sensor and a method for assembling the same will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Referring to FIGS. 1 to 4, a radar sensor 1 for a vehicle in accordance with an embodiment of the present disclosure includes a cover 100, a measurement unit 200, a shield case 300, a housing 400 and a plurality of heat conductors 500.

The cover 100 is a radome that transmits electromagnetic waves. The cover 100 may be formed in various shapes as long as the cover 100 does not absorb or reflect electromagnetic waves generated by the measurement unit 200 but can transmit the electromagnetic waves.

For example, the cover 100 may include a cover body 110 and a cover coupling part 120. The cover body 110 has a plate shape to cover an entrance 418 of the housing 400. The cover coupling part 120 is extended from the outer edge of the cover body 110 toward the housing 40 which will be described below, and locked and coupled to a stepped part 413 of the housing 400.

The measurement unit 200 is disposed at a position facing the cover 100, and generates electromagnetic waves to sense an object ahead of the cover 100. At this time, various shapes of measurement devices may be used as the measurement unit 200, as long as the measurement devices can generate electromagnetic waves to sense an object.

The shield case 300 is coupled to the measurement unit 200, and blocks electromagnetic waves generated by the measurement unit 200 such that the electromagnetic waves are discharged to the entrance 418 of the housing 400 to be described below. Thus, the object located ahead of the cover 100 can be sensed more accurately.

The shield case 300 is located at a position facing the cover 100 and disposed in the housing 400, and has a shielding space concave toward the measurement unit 200. At this time, the shield case 300 may be modified in various shapes as long as the shield case 300 can block the electromagnetic waves generated by the measurement unit 200. The material of the shield case 300 may include one or more materials of copper, aluminum, an alloy of copper and nickel and the like.

As illustrated in FIGS. 1 to 4, the housing 400 has an internal space 417 in which the shield case 300 and the measurement unit 200 are disposed, and the cover 100 is installed at the open entrance 418.

For example, the housing 400 includes a housing body 410 and a connector 420. The housing body 410 in which the shield case 300 and the measurement unit 200 are disposed is coupled to the cover 100. The housing body 410 includes a base part 411, a sidewall part 412, the stepped part 413, a support part 414 and a coupling part 415. The base part 411 is formed in a plate shape to face the measurement unit 200.

The sidewall part 412 is extended from the edge of the base part 411, and forms the internal space 417, in which the shield case 300 and the measurement unit 200 are disposed, with the base part 411.

The stepped part 413 is extended outward from the sidewall part 412, and the cover coupling part 120 is locked and coupled to the stepped part 413.

The support part 414 is formed in a bump shape to protrude inward from the sidewall part 412, and supports the bottom of the measurement unit 200. The support part 414 is extended in the coupling direction of the measurement unit 200. The edge of a board 210 of the measurement unit 200 may be locked to the support part 414. The board 210 may be a circuit board or printed circuit board.

The connector 420 is coupled as one body with the housing 400, and has a connect pin 421 protruding into the housing 400. Since the connect pin 421 is inserted into a fixing hole 211 of the board 210 of the measurement unit 200 and the central portion of the connect pin 421 is locked to the fixing hole 211, the board 210 may be suppressed from moving downward (see FIG. 3).

Figure 5:
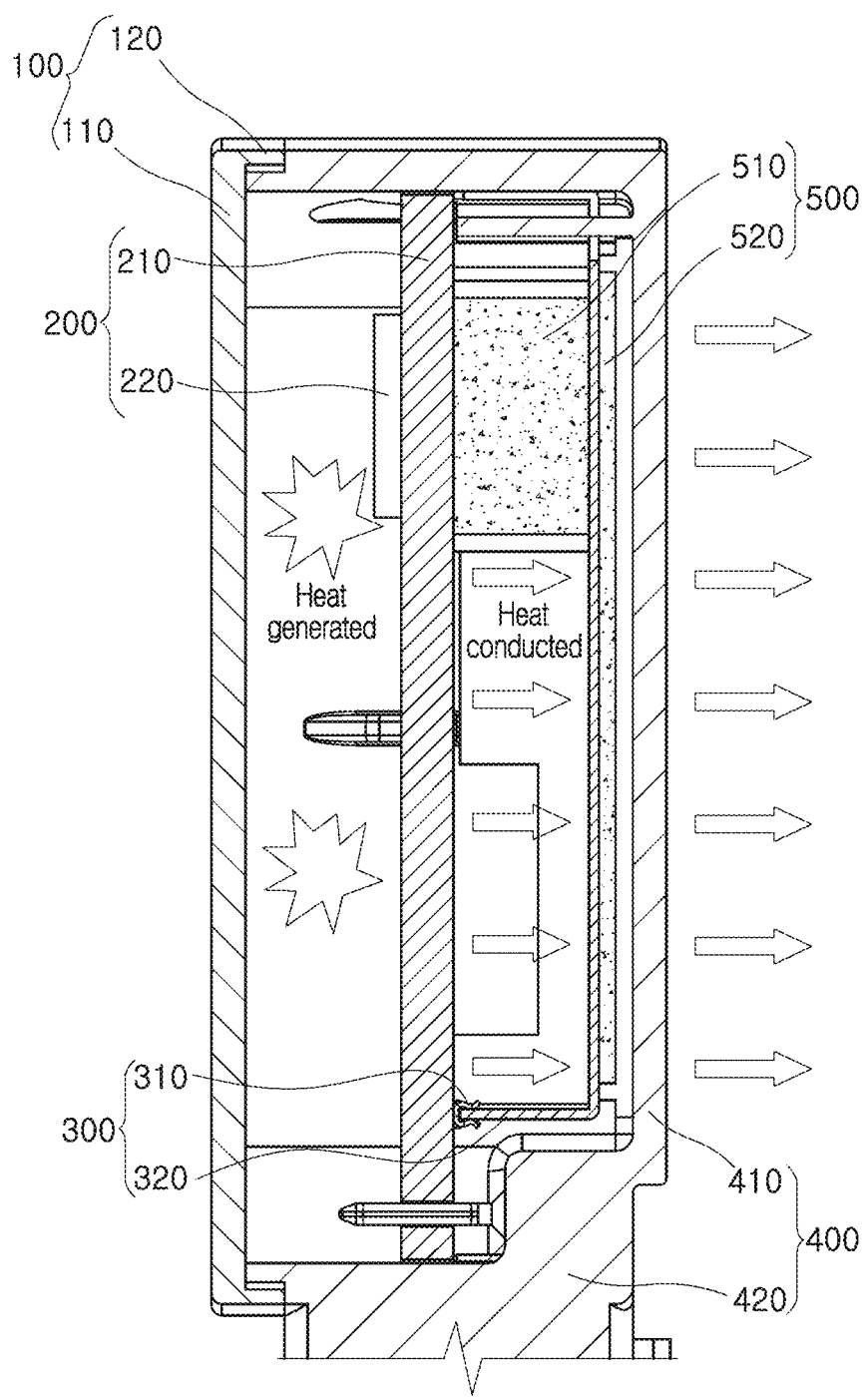
FIG. 5 is a diagram illustrating that heat generated from a measurement unit of the radar sensor for a vehicle in accordance with the embodiment of the present disclosure is conducted and discharged to the outside of a housing.

The plurality of heat conductors 500 are disposed between the measurement unit 200 and the shield case 300 and between the shield case 300 and the housing 400, and conduct heat, generated by the measurement unit 200, from the shield case 300 to the housing 400 such that the heat is discharged to the outside of the housing 400 (see FIG. 5).

When the measurement unit 200 generates electromagnetic waves, heat is generated, and the internal temperature of the housing 400 rises. When the internal temperature of the radar sensor 1 for a vehicle rises up to 170 degrees, an abnormality may occur in the performance of the radar sensor 1 for a vehicle.

In the radar sensor 1 in accordance with the embodiment of the present disclosure, however, the heat conductors 500 may be disposed between the measurement unit 200 and the shield case 300 and between the shield case 300 and the housing 400, respectively, and contacted with the measurement unit 200, the shield case 300 and the housing 400, such that the heat generated by the measurement unit 200 can be conducted to the housing 400 through the shield case 300.

Thus, the heat conducted to the housing 400 may be discharged to the outside, and the internal temperature of the housing 400 may fall. That is, the internal temperature of the radar sensor 1 for a vehicle may fall.

The plurality of heat conductors 500 include a first heat conductor member 510 and a second heat conductor member 520. The first heat conductor member 510 is disposed between the measurement unit 200 and the shield case 300 and coupled to the measurement unit 200 and the shield case 300, and conducts heat, generated by the measurement unit 200, from the shield case 300.

The second heat conductor member 520 is disposed between the shield case 300 and the housing 400 and coupled to the shield case 300 and the housing 400, and conducts the heat, conducted from the shield case 300, to the housing 400.

The measurement unit 200 includes the board 210 and a radar semiconductor 220. The board 210 faces the cover 100, and the first heat conductor member 510 is coupled to the board 210. The board 210 has the fixing hole 211 into which the connect pin 421 is inserted.

The radar semiconductor 220 is installed on the board 210, and generates electromagnetic waves to sense an object located ahead of the cover 100. At this time, various shapes of measurement devices may be used as the measurement unit 200, as long as the measurement devices can generate electromagnetic waves to sense an object.

The shield case 300 includes a plurality of clips 310 and a shield case body 320. The clips 310 are coupled to a surface of the board 210, facing the housing 400. The plurality of clips 310 may be disposed at the edge of the board 210 so as to be spaced apart from one another. The clips 310 may be modified in various shapes as long as the shield case body 320 to be described below can be coupled to the clips 310.

The shield case body 320 is fitted and coupled to the clips 310, and the first heat conductor member 510 is coupled to a surface of the shield case body 320, facing the measurement unit 200. The first heat conductor member 510 may have a height equal to or larger than a distance between the shield case body 320 and the board 210. For example, the first heat conductor member 510 may have a height of about 4 mm, a width of about 8 mm and a length of about 8 mm.

The housing 400 has the coupling part 415 formed on a surface thereof, facing the shield case 300, and having a coupling groove 416 to which the second heat conductor member 520 is coupled. For example, the coupling groove 416 may have a height of about 1 mm, a width of about 11 mm and a length of about 25 mm. The second heat conductor member 520 is located in the coupling groove 416.

The heat conductor 500 may be made of a curable paste material. That is, the first and second heat conductor members 510 and 520 may be made of a curable paste material.

As the first heat conductor member 510 is made of a curable paste material, the first heat conductor member 510 may be pressed between the measurement unit 200 and the shield case 300, and coupled as one body with the measurement unit 200 and the shield case 300.

Specifically, the first heat conductor member 510 may be applied onto the board 210 of the measurement unit 200, and pressed while the shield case body 320 of the shield case 300 is fitted and coupled to the clips 310 of the shield case 300, coupled to the board 210, such that the width of the first heat conductor member 510 becomes larger than when the first heat conductor member 510 is applied. Then, the first heat conductor member 510 may be naturally cured and coupled as one body with the board 210 and the shield case body 320.

As the second heat conductor member 520 is made of a curable paste material, the second heat conductor member 520 may be pressed between the shield case 300 and the housing 400, and coupled as one body with the shield case 300 and the housing 400.

Specifically, the second heat conductor member 520 may be applied onto the coupling groove 416 formed in the coupling part 415 of the housing 400, and pressed while the measurement unit 200 and the shield case 300 are coupled into the housing 400, such that the width of the second heat conductor member 520 becomes larger than when the second heat conductor member 520 is applied. Then, the second heat conductor member 520 may be naturally cured and coupled as one body with the housing 400 and the shield case body 320 of the shield case 300.

As the first heat conductor member 510 is coupled to the measurement unit 200 and the shield case 300 and the second heat conductor member 520 is coupled to the shield case 300 and the housing 400, the heat generated by the measurement unit 200 may be conducted to the housing 400 through the shield case 300 and discharged to the outside.

Figure 6:
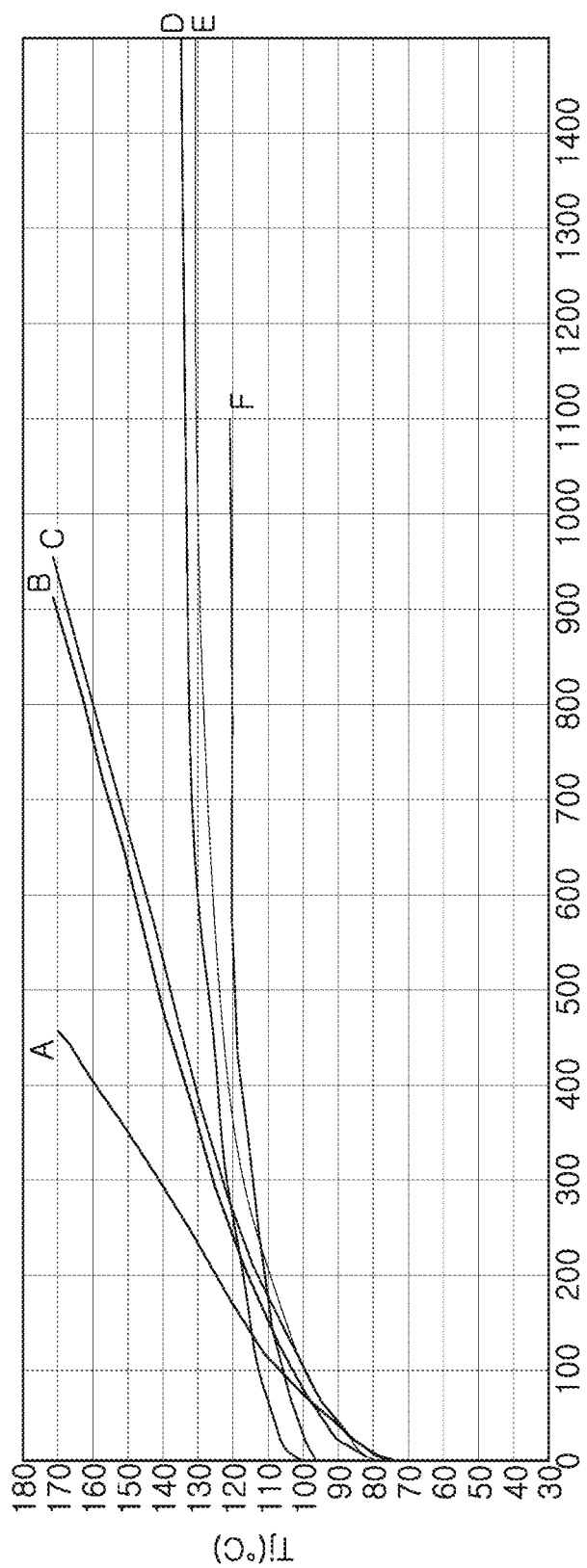
FIG. 6 is a graph illustrating the internal temperature of the radar sensor for a vehicle in accordance with the embodiment of the present disclosure.
Figure 7:
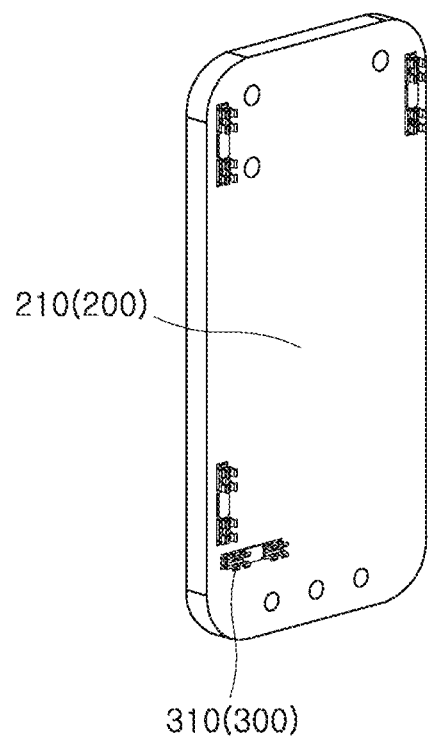
FIG. 7 is a diagram illustrating the state in which clips of a shield case are coupled to the measurement unit of the radar sensor for a vehicle in accordance with the embodiment of the present disclosure.
Figure 8:
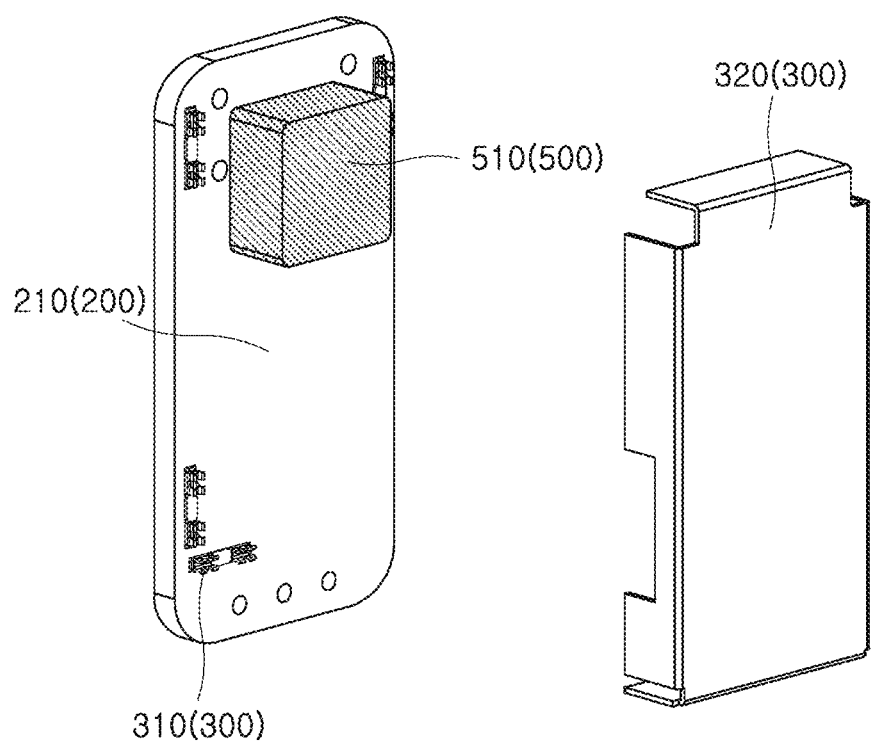
FIG. 8 is a diagram illustrating the state in which a first heat conduction member is applied onto the measurement unit of the radar sensor for a vehicle in accordance with the embodiment of the present disclosure and a shield case body is coupled to the clips.

FIG. 6 is a graph illustrating the internal temperature of the radar sensor for a vehicle in accordance with the embodiment of the present disclosure. In the graph, A represents a radar sensor with none of the first and second heat conductor members 510 and 520, B and C represent radar sensors with only the first heat conductor member 510, and D, E and F represent radar sensors with both of the first and second heat conductor members 510 and 520.

The radar sensor B has a structure in which the first heat conductor member 510 is applied onto the board 210 of the measurement unit 200 so as to have a height of 1 mm, and the radar sensor C has a structure in which the first heat conductor member 510 is applied onto the board 210 of the measurement unit 200 so as to have a height of 4 mm.

The radar sensor D has a structure in which the first heat conductor member 510 is applied onto the board 210 of the measurement unit 200 so as to have a height of about 1 mm, and the second heat conductor member 520 is applied onto the housing 400 so as to have a width of about 4 mm, a length of about 4 mm and a height of about 1 mm.

The radar sensor F has a structure in which the first heat conductor member 510 is applied onto the board 210 of the measurement unit 200 so as to have a height of about 4 mm, and the second heat conductor member 520 is applied onto the housing 400 so as to have a width of about 8 mm, a length of about 8 mm and a height of about 1 mm.

The radar sensor E has a structure in which the first heat conductor member 510 is applied onto the board 210 of the measurement unit 200 so as to have a height of about 4 mm, and the second heat conductor member 520 is applied onto the housing 400 so as to have a width of about 11 mm, a length of about 25 mm and a height of about 1 mm.

The graph shows that the internal temperature of the radar sensor A with none of the first and second heat conductor members 510 and 520 rises up to 170 degrees, but the internal temperatures of the radar sensors B to D become relatively low in descending order while heat conduction is smoothly performed.

That is, the graph shows that, as heat is conducted through the first and second heat conductor members 510 and 520 and discharged to the outside of the radar sensor, the internal temperature of the radar sensor for a vehicle falls.

Hereafter, a method for assembling the radar sensor 1 for a vehicle in accordance with an embodiment of the present disclosure and an operation and effect thereof will be described with reference to FIGS. 7 to 14.

The method for assembling the radar sensor 1 for a vehicle includes a first assembling step S10, a second assembling step S20 and a third assembling step S30. In the first assembling step S10, the first heat conductor member 510 is applied onto the measurement unit 200, and the shield case 300 is coupled to the measurement unit 200.

In the second assembling step S20, the second heat conductor member 520 is applied onto the housing 400, and the measurement unit 200 is coupled to the housing 400. In the third assembling step S30, the cover 100 is coupled to the housing 400.

The first and second heat conductor members 510 and 520 may be made of a curable paste material.

Thus, when the shield case 300 is coupled to the measurement unit 200 after the first heat conductor member 510 is applied onto the measurement unit 200, the first heat conductor member 510 may be naturally cured between the measurement unit 200 and the shield case 300, and coupled as one body with the measurement unit 200 and the shield case 300.

Similarly, when the shield case 300 with the measurement unit 200 is coupled into the housing 400 after the second heat conductor member 520 is applied onto the housing 400, the second heat conductor member 520 may be naturally cured between the housing 400 and the shield case 300, and coupled as one body with the housing 400 and the shield case 300.

The first assembling step S10 includes a clip coupling step S11, a first heat conductor member applying step S12 and a shield case body coupling step S13. In the clip coupling step S11, the clips 310 of the shield case 300 are coupled to the board 210 of the measurement unit 200 (see FIG. 7). The clips 310 are welded and coupled to the surface of the board 210, facing the housing 400. The radar semiconductor 220 is welded and coupled to the surface of the board 210, facing the cover 100.

In the first heat conductor member applying step S12, the first heat conductor member 510 is applied onto the board 210. The first heat conductor member 510 is applied onto the surface of the board 210, facing the housing 400 (see FIG. 8). At this time, the first heat conductor member 510 may be applied to have a width of about 8 mm, a length of about 8 mm and a height of about 1 mm.

Figure 9:
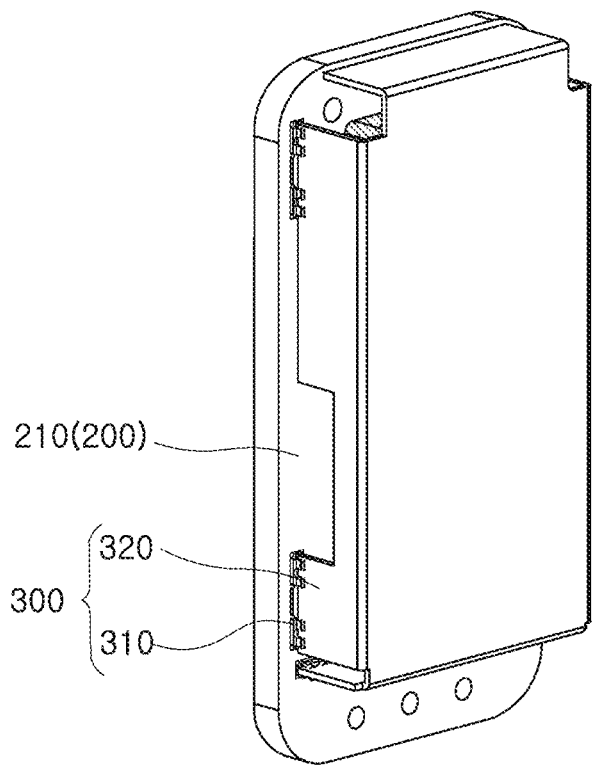
FIG. 9 is a diagram illustrating the state in which the shield case body is coupled to the clips of the radar sensor for a vehicle in accordance with the embodiment of the present disclosure.
Figure 10:
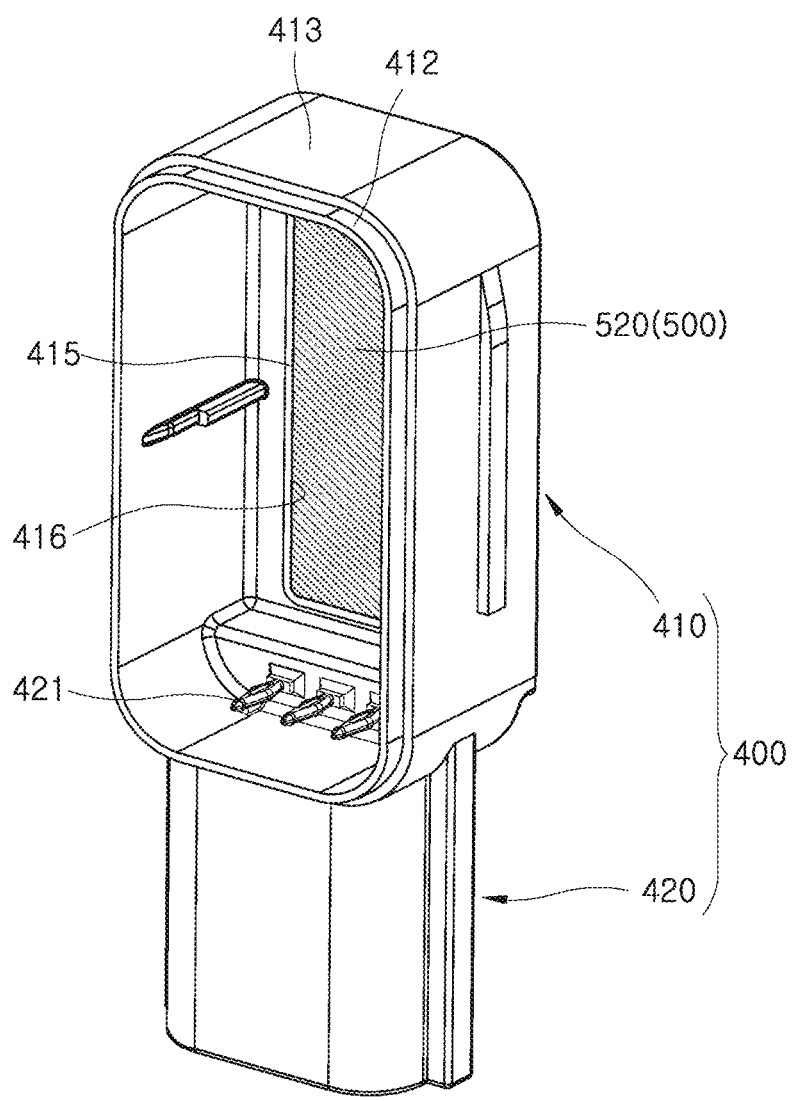
FIG. 10 is a diagram illustrating the state in which a second heat conduction member is applied onto the housing of the radar sensor for a vehicle in accordance with the embodiment of the present disclosure.

In the shield case body coupling step S13, the shield case body 320 of the shield case 300 is fitted and coupled to the clips 310 and brought into contact with the first heat conductor member 510 (see FIG. 9). In the shield case body coupling step S13, the first heat conductor member 510 is pressed between the board 210 and the shield case body 320, and coupled as one body with the board 210 and the shield case body 320 while naturally cured.

Figure 11:
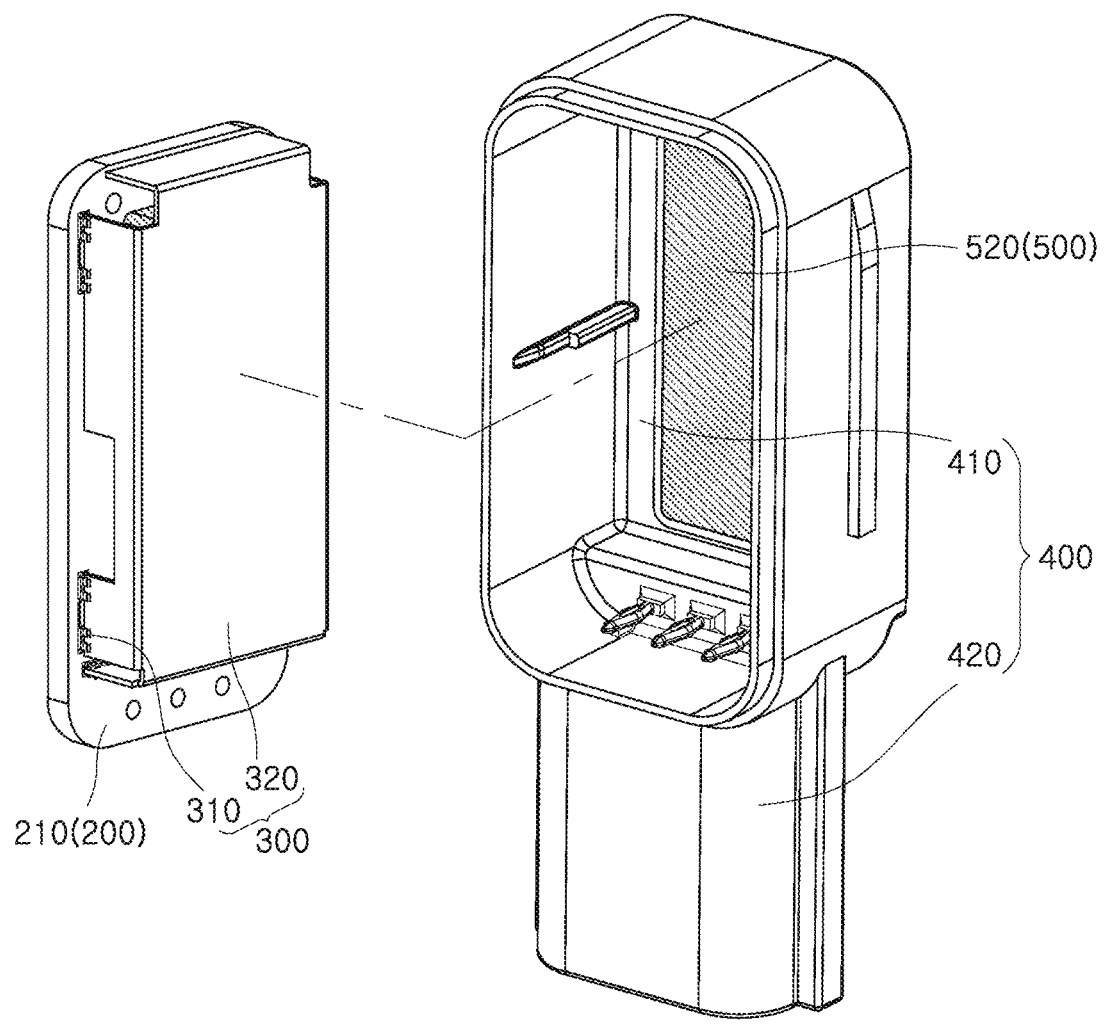
FIG. 11 is a diagram illustrating the state in which the measurement unit and the shield case are coupled to the housing of the radar sensor for a vehicle in accordance with the embodiment of the present disclosure.
Figure 12:
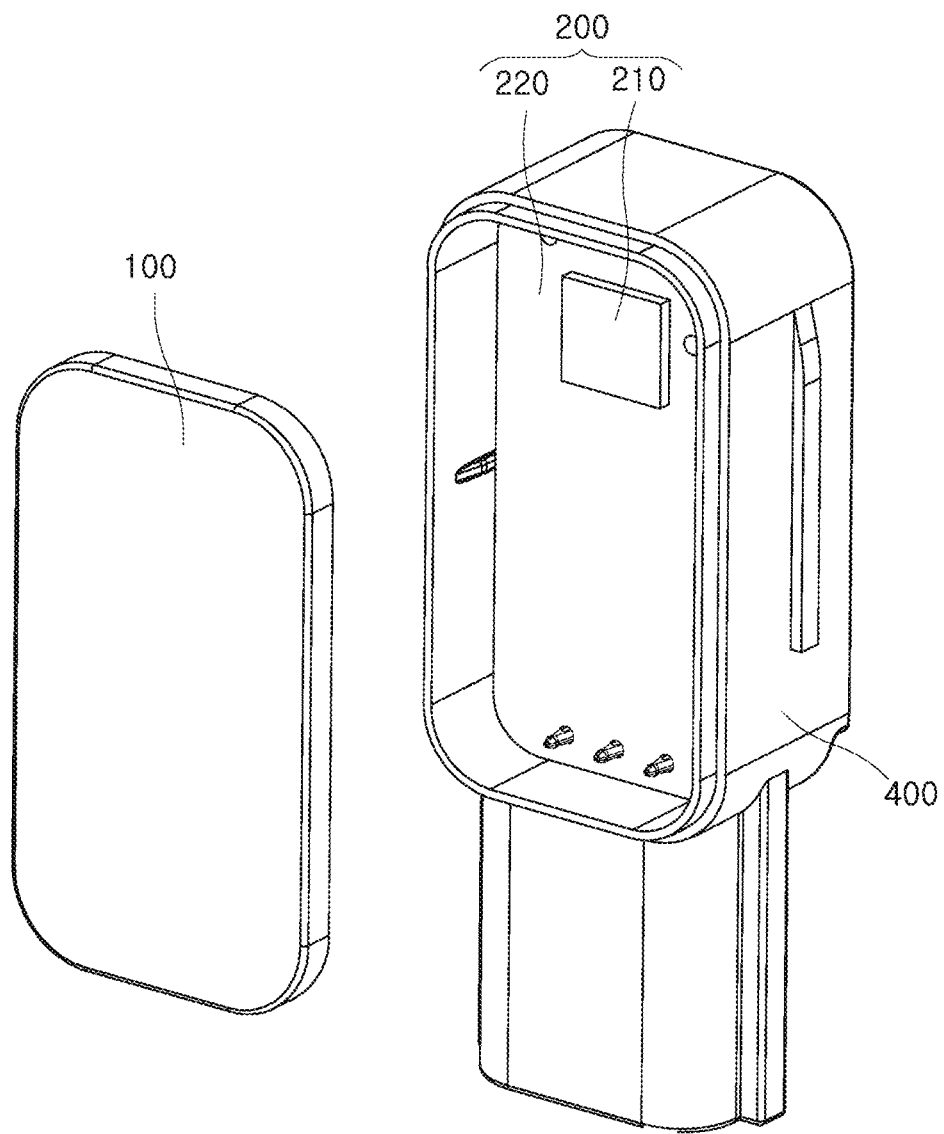
FIG. 12 is a diagram illustrating the state in which a cover is coupled to the housing of the radar sensor for a vehicle in accordance with the embodiment of the present disclosure, with the measurement unit and the shield case coupled to the housing.
Figure 13:
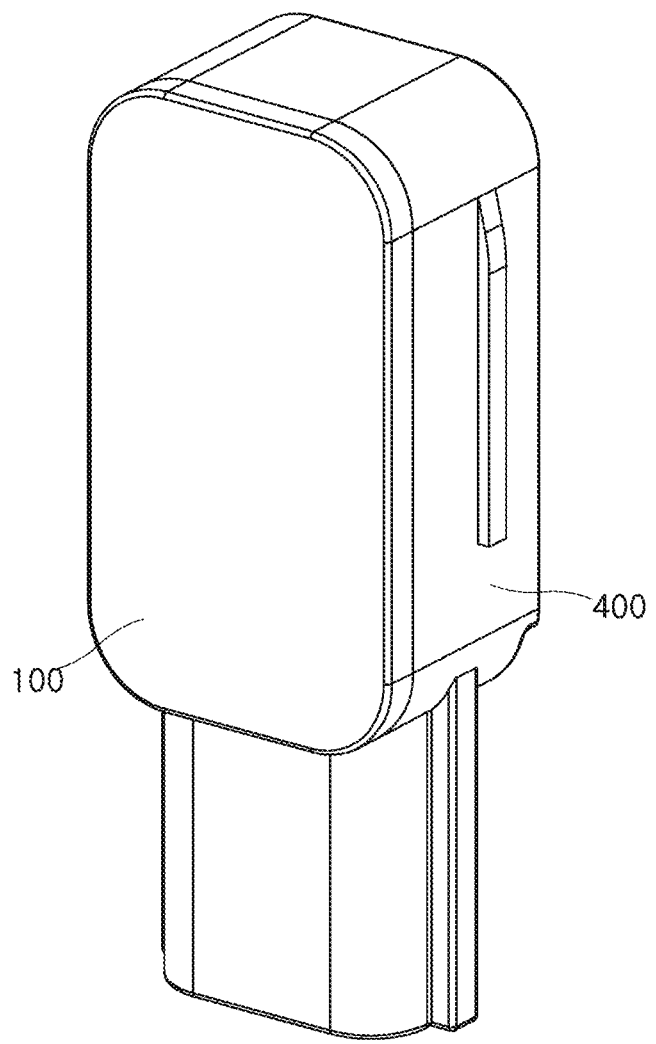
FIG. 13 is a diagram illustrating the state in which the cover is coupled to the housing of the radar sensor for a vehicle in accordance with the embodiment of the present disclosure.
Figure 14:
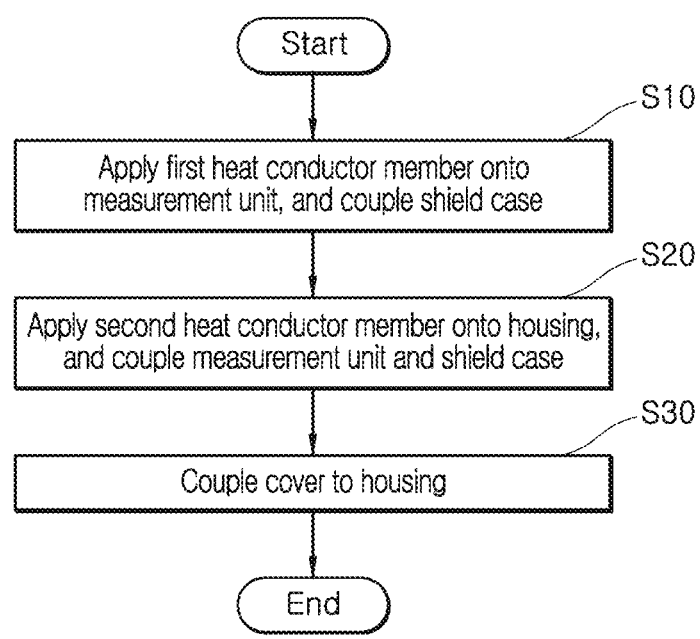
FIG. 14 is a flowchart illustrating a method for assembling a radar sensor for a vehicle in accordance with an embodiment of the present disclosure.

In the second assembling step S20, the second heat conductor member 520 is applied onto the coupling part 415 of the housing 400, pressed between the housing 400 and the shield case 300, and coupled as one body to the housing 400 and the shield case 300 while naturally cured (see FIG. 11).

The coupling part 415 has the coupling groove 416 formed therein, and the second heat conductor member 520 is applied into the coupling groove 416. At this time, the coupling groove 416 may have a height of about 1 mm, a width of about 11 mm and a length of about 25 mm.

In the third assembling step S30, when the shield case 300 is coupled to the housing 400, the cover 100 is coupled to the housing 400.

When the radar sensor 1 for a vehicle is assembled though the above-described assembling method and then operated, heat generated from the measurement unit 200 may be conducted to the housing 400 through the shield case 300 by the first and second heat conductor members 510 and 520, and then discharged to the outside.

Thus, the internal temperature of the radar sensor 1 for a vehicle may fall to prevent damage to the radar sensor 1, which may occur as the internal temperature of the radar sensor 1 rises.

As illustrated in FIGS. 15 to 33, a radar sensor 1 for a vehicle in accordance with another embodiment of the present disclosure includes a cover 10, a measurement unit 20, a shield case 30 and a housing 40. The cover 10 transmits electromagnetic waves. The measurement unit 20 is installed at a position facing the cover 10, and generates electromagnetic waves to sense an object. The shield case 30 is installed at a position facing the cover 10 with the measurement unit 20 interposed therebetween, and blocks electromagnetic waves generated by the measurement unit 20. The housing 40 has an internal space 58 in which the shield case 30 and the measurement unit 20 are installed, and includes an open entrance 57 at which the cover 10 is installed.

As illustrated in FIGS. 15 to 26, the cover 10 may be formed in various shapes as long as the cover 10 does not absorb or reflect electromagnetic waves generated by a radar semiconductor 24 but can transmit the electromagnetic waves.

As the material of the cover 10 in accordance with the present embodiment, PBT (Polybutylene Terephthalate) resin including glass fiber at a proportion of 20% to 30% is used. Furthermore, a material whose dielectric constant ranges from 2.9 to 3.6 in the 79 GHz band is used. The cover 10 includes a cover body 12, an inner member 14, an outer member 16 and a movement prevention protrusion 18.

The cover body 12 has a plate shape to cover the entrance 57, and the inner member 14 protrudes from the cover body 12 so as to be located in the housing 40. The outer member 16 is installed at a position facing the inner member 14, with a protrusion 54 of the housing 40 interposed therebetween. The outer member 16 in accordance with the present embodiment protrudes from the edge of the cover body 12 so as to be located outside the housing 40.

The movement prevention protrusion 18 is formed in a protrusion shape that protrudes from the inner member 14 or the outer member 16 facing the housing 40 and abuts on the housing 40. The movement prevention protrusion 18 in accordance with the present embodiment protrudes from a side surface of the outer member 16, facing the inner member 14, and abuts on the protrusion 54.

In order to prevent the movement of the cover 10 with the cover 10 assembled to the housing 40, the movement prevention protrusion 18 is additionally installed on the outer member 16 of the cover 10.

While the entrance 57 of the housing 40 is covered by the cover 10, the protrusion 54 is located between the inner member 14 and the outer member 16. Since the upper portion of the cover 10 facing the outer member 16 is welded through laser welding, the cover 10 is fixed to the housing 40 while the length of the protrusion 54 is reduced.

The measurement unit 20 may be installed at a position facing the cover 10, and various shapes of measurement devices may be used as the measurement unit 20, as long as the measurement devices can generate electromagnetic waves to sense an object. The measurement unit 20 in accordance with the present embodiment includes a board 22, the radar semiconductor 24 and a fixing hole 28. The board 22 may be a circuit board or printed circuit board.

As the board 22, a printed circuit board is used. The board 22 is separated from the cover 10 and fixed to the inside of the housing 40. The radar semiconductor 24 is installed on the board 22 formed in a plate shape, and generates electromagnetic waves to sense an object.

The measurement unit 20 includes a set area 26 located on one side of the board 22, where the radar semiconductor 24 is located. In the set area, no elements are disposed. The set area 26 in accordance with the present embodiment is set as an area which is formed on one side of the board 22 including the radar semiconductor 24 and in which a printed circuit and elements are not installed, in order to improve the performance of the radar semiconductor 24.

The measurement unit 20 includes the set area 26 which is set around the radar semiconductor 24 and in which circuit elements are not disposed, and the printed circuit and the shield case 30 are designed not to abut on the set area 26.

Figure 27:
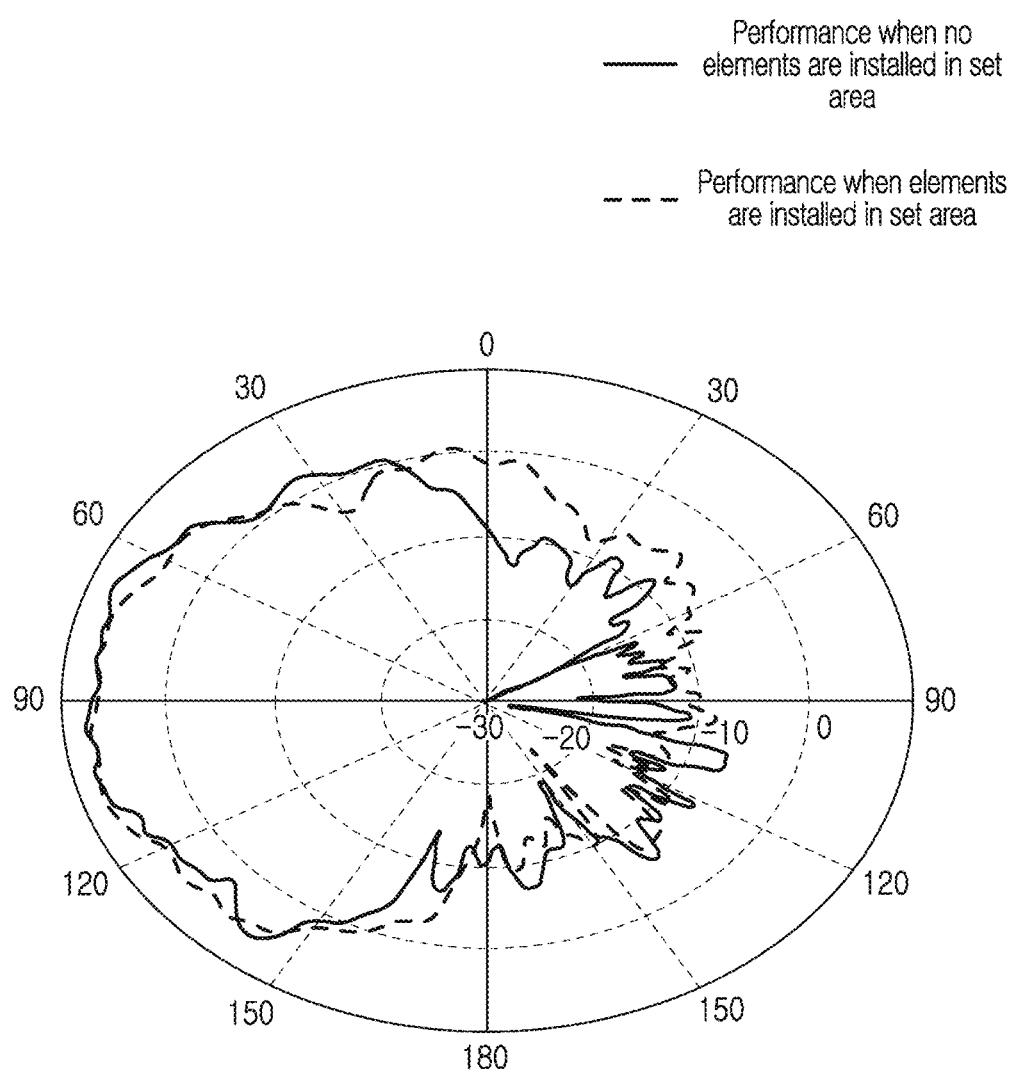
FIG. 27 is a diagram illustrating beam patterns emitted from the measurement unit in accordance with the embodiment of the present disclosure.

FIG. 27 shows that, when elements are disposed in the set area 26, the performance of the radar sensor 1 for a vehicle is changed while a beam pattern over the set area 26 is widened by the interference between the elements.

As illustrated in FIGS. 19 to 25, setting a distance between the cover 10 and the radar semiconductor 24 in the radar sensor 1 is an important element. Based on the electromagnetic theory, electromagnetic waves generated by the radar semiconductor 24 are reflected from the bottom surface of the cover 10 when passing through the cover 10 after passing through the air.

Thus, since the thickness of the cover 10 is set according to a dielectric constant, the reflection of the electromagnetic waves needs to be minimized, in order to optimize the performance of the radar sensor 1.

The cover 10 in accordance with the present embodiment needs to be designed to have a thickness of about 1.09 mm when a material having a dielectric constant of 3 is used in the 79 GHz band in which the radar semiconductor 24 is operated, and a simulation result shows that the lowest reflection coefficient was measured at the thickness.

When the thickness of the cover 10 is 1.0 mm, the distance between the radar semiconductor 24 and the cover 10 may be set to 3.8 mm, and the set value can be changed if necessary.

The shield case 30 is installed at a position facing the cover 10 with the measurement unit 20 interposed therebetween, and may be modified in various shapes as long as the shield case 30 can block the electromagnetic waves generated by the measurement unit 20. The shield case 30 in accordance with the present embodiment is located inside the housing 40, and has a shielding space concave toward the measurement unit 20. As the material of the shield case 30 in accordance with the present embodiment, one or more of copper, aluminum and an alloy of copper and nickel may be used.

As illustrated in FIGS. 17 to 24, the housing 40 has the internal space 58 in which the shield case 30 and the measurement unit 20 are installed, includes the open entrance 57 at which the cover 10 is installed, and may be modified in various shapes as long as the housing 40 is configured as a connector-integrated housing into which connector pins 62 is inserted.

The housing 40 in accordance with the present embodiment includes a housing body 50, a connector body 60, a first guide protrusion 66 and a stopper protrusion 68, and is divided into a three-pin connector structure and a six-pin connector structure according to a communication method.

The material of the housing 40 is decided by a watertight structure of the measurement unit 20. When the measurement unit 20 serving as a sensor requires a watertight structure, the cover 10 and the housing 40 are made of the same material, and fixed by laser welding. However, when the measurement unit 20 serving as a sensor is installed, the watertight structure may not be needed. In this case, the housing 40 is made of a general plastic material, and then coupled to the cover 10.

The housing body 50 in which the shield case 30 and the measurement unit 20 are located may be modified in various shapes as long as the housing body 50 is coupled to the cover 10. The housing body 50 in accordance with the present embodiment includes a base part 51, a first sidewall part 52, a second sidewall part 53, a protrusion 54, a plurality of support body parts 55 and a side fixing part 56.

The base part 51 is formed in a plate shape facing the measurement unit 20, and installed in the horizontal direction. The first sidewall part 52 is extended upward from the edge of the base part 51, and forms an internal space in which the shield case 30 is seated.

The second sidewall part 53 is extended upward from the first sidewall part 52, the inside of the second sidewall part 53 faces the edge of the measurement unit 20, and an upper end of the second sidewall part 53 faces the inner member 14 and the outer member 16. At the boundary between the first and second sidewall parts 52 and 53, a stepped part is formed, to which the measurement unit 20 is locked. The board 22 is locked and fixed to the upper portion of the first sidewall part 52.

The protrusion 54 is extended upward from the second sidewall part 53, and located between the inner member 14 and the outer member 16. The upper end of the protrusion 54 is fixed in contact with the cover body 12, and the lower ends of the inner member 14 and the outer member 16 are fixed in contact with the upper end of the second sidewall part 53.

The cover 10 and the housing body 50 are subjected to laser welding for the watertight structure. For this operation, the protrusion 54 is moved between the inner member 14 and the outer member 16 and assembled to the inner member 14 and the outer member 16.

At this time, the length of the protrusion 54 is larger by 0.2 to 0.3 mm than the length of the inner and outer members 14 and 16, and the protrusion 54 is molten by 0.2 to 0.3 mm during laser welding. Thus, the protrusion 54 is fixed in contact with the cover body 12.

Figure 28:
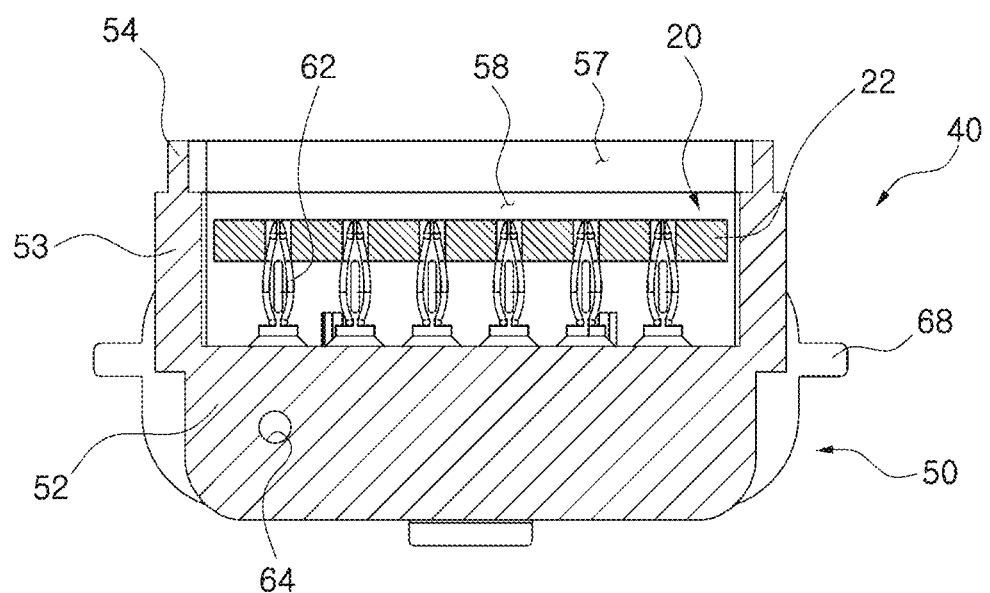
FIGS. 28 and 29 are cross-sectional views illustrating the state in which the measurement unit in accordance with the embodiment of the present disclosure is provisionally assembled to connector pins.
Figure 29:
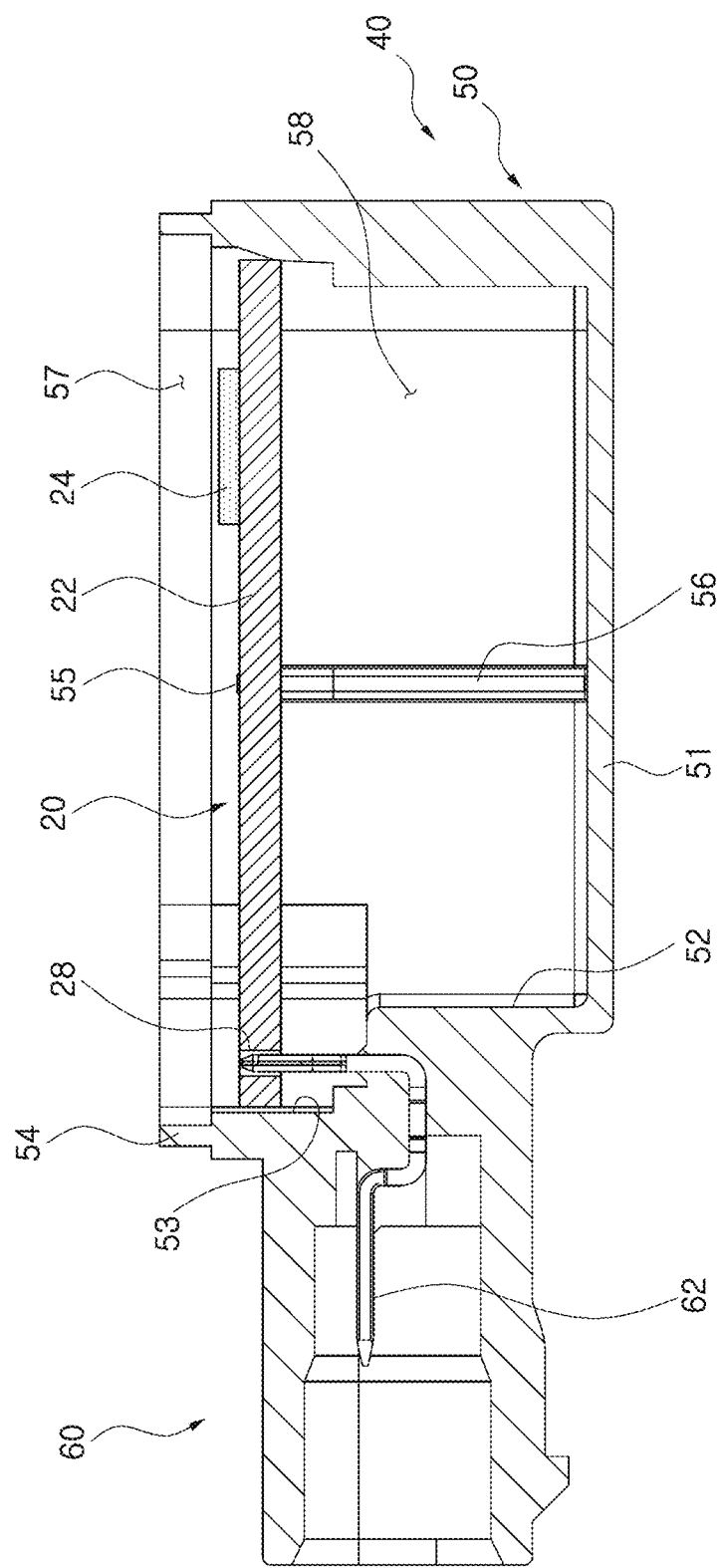
Figure 30:
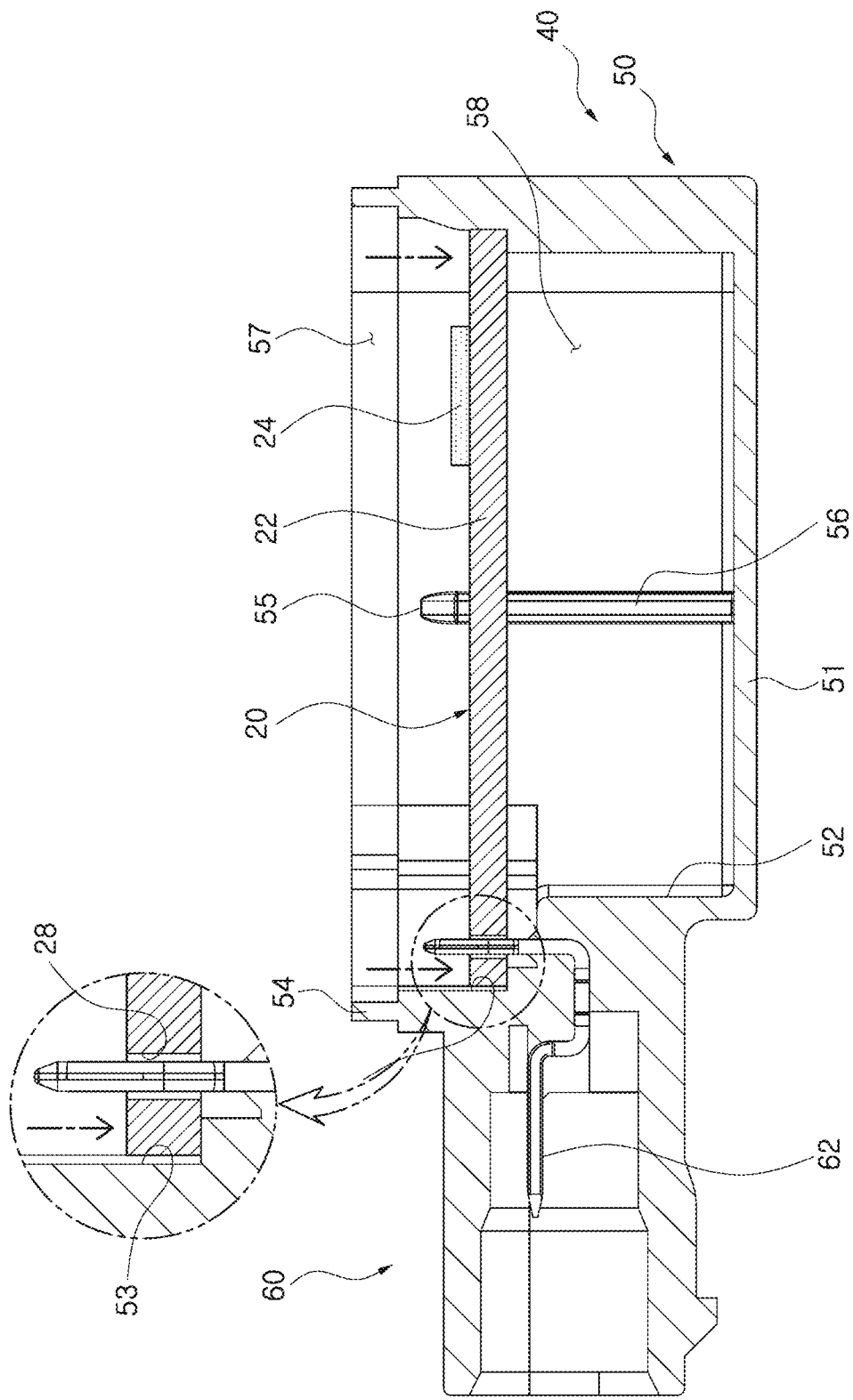
FIG. 30 is a cross-sectional view illustrating the state in which the measurement unit in accordance with the embodiment of the present disclosure is locked and fixed to the upper portion of a first sidewall part.

As illustrated in FIGS. 28 to 30, the connector body 60 is extended from the housing body 50, and has the connector pins 62 installed therein. The connector body 60 in accordance with the present embodiment includes the connector pins 62 and a pressure hole 64.

One side of the connector pin 62 is located in the connector body, and the other side of the connector pin 62 protrudes upward from the first sidewall part 52 so as to be connected to the measurement unit 20. The middle portion of the connector pin 62 protruding upward from the first sidewall part 52 has a larger width than the upper and lower portions thereof.

Therefore, when the connector pin 62 is inserted into the fixing hole 28, the middle portion of the connector pin 62 is locked to the fixing hole 28. Thus, the board 22 is primarily suppressed from moving downward.

The measurement unit 20 is seated on the upper portion of the first sidewall part 52, and the connector pin 62 protrudes upward from the board 22 through the fixing hole 28 formed in the measurement unit 20. The connector pin 62 is electrically coupled to the board 22 by a soldering operation.

The plurality of support body parts 55 are formed in a protrusion shape that protrudes to the inside of the first and second sidewall parts 52 and 53, and is extended in the coupling direction of the measurement unit 20. The plurality of support body parts 55 in accordance with the present embodiment are installed at positions facing the connector pins 62, and extended in the top-to-bottom direction.

Therefore, since the other side of the board 22 is locked to the support body part 55 with the connector pin 62 inserted into the fixing hole 28 formed on one side of the board 22, the board 22 is provisionally assembled.

The side fixing part 56 is formed in a protrusion shape that protrudes from the support body part 55 and supports the bottom of the measurement unit 20, and the upper portion of the side fixing part 56 is formed in a bump shape to which the board 22 is locked.

The plurality of support body parts 55 are installed at positions facing the edge of the board 22, and only the side fixing part 56 without the support body parts 55 is installed in the housing body 50 facing both sides of the board 22.

When internal pressure rises due to a difference between inside and outside temperatures of the radar sensor 1 for a vehicle, a crack may occur in a laser welded portion. In order to prevent such a crack, the pressure hole 64 is additionally formed in the connector body 60. Since the connector body 60 has a watertight structure, water is not introduced into the housing 40 even though the pressure hole 64 is formed in the connector body 60.

Figure 32:
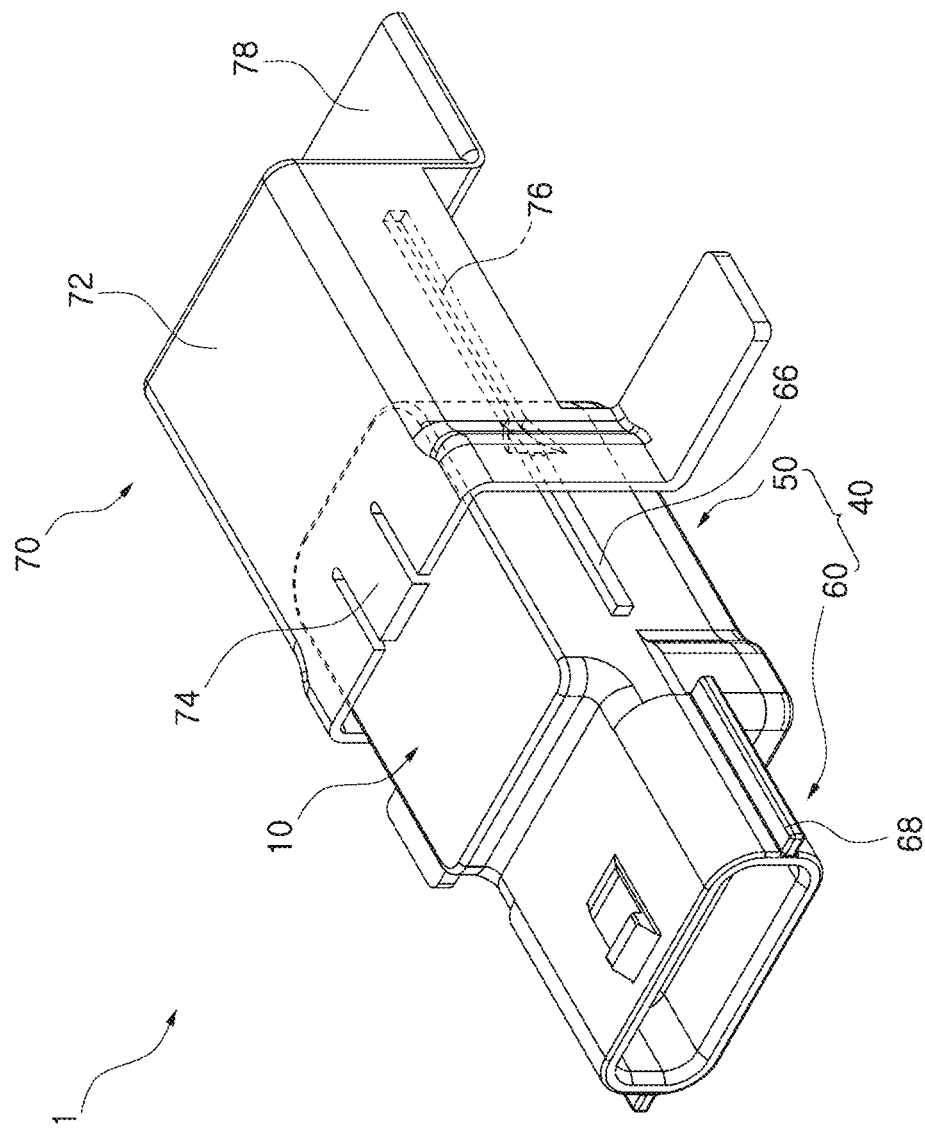
FIG. 32 is a perspective view illustrating a state before the housing is coupled to the holder in accordance with the embodiment of the present disclosure.
Figure 33:
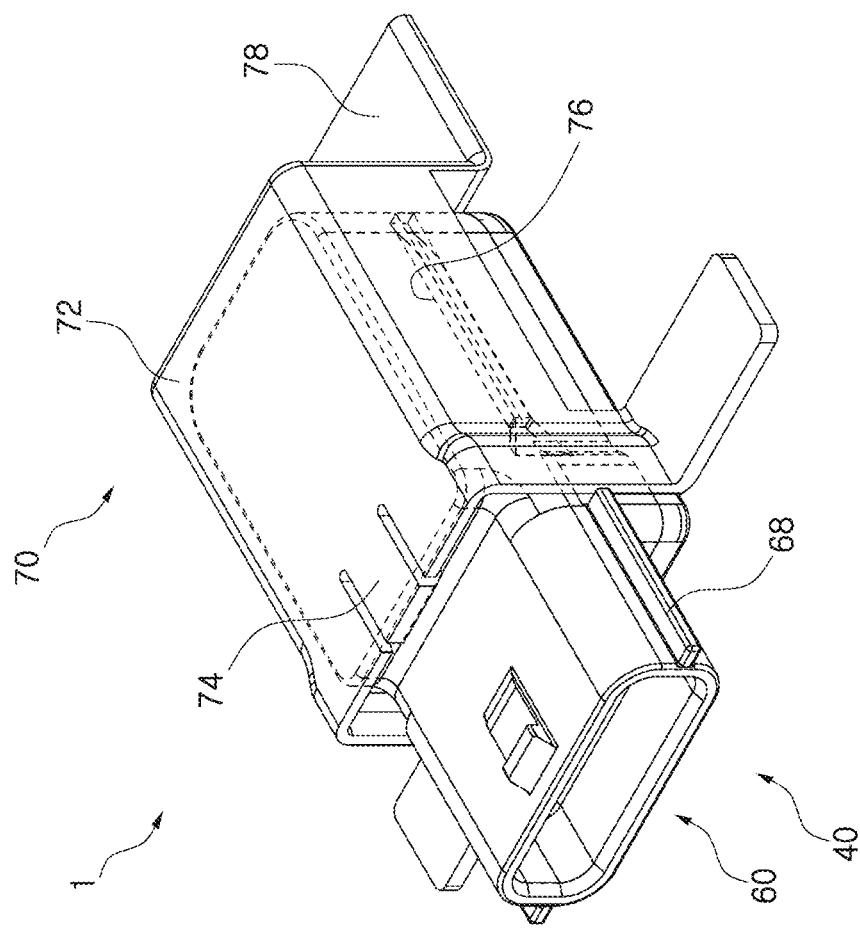
FIG. 33 is a perspective view illustrating the state in which the housing is coupled to the holder in accordance with the embodiment of the present disclosure.

As illustrated in FIGS. 32 and 33, a holder 70 is installed in a shape to cover the outside of the housing 40, and may be modified in various shapes as long as the holder 70 is fixed to a vehicle body.

The holder 70 is made of PBT or PA to which carbon fiber is added, in order to absorb electromagnetic waves radiated through the rear surface thereof. Furthermore, the holder 70 is made of a material whose dielectric constant is 12 or more in the 79 GHz band. The holder 70 in accordance with the present embodiment includes a first holder body 72, a hook protrusion 74, a first guide groove 76 and a first fixed piece 78.

The housing 40 and the holder 70 may be coupled according to two kinds of methods. According to the first method, the rib-shaped first guide protrusions 66 are installed on both sides of the housing 40 and horizontally assembled to the holder 70 in a sliding manner. At this time, the separate hook protrusion 74 is installed in the holder 70 in order to fix the housing 40.

The first holder body 72 is installed in a shape to cover the outside of the housing 40, and a part of side surfaces and a bottom surface, which face the cover 10, are removed. The side surfaces of the holder 70 are removed so as to have no influence on horizontal beam patterns of the radar semiconductor 24.

Figure 31:
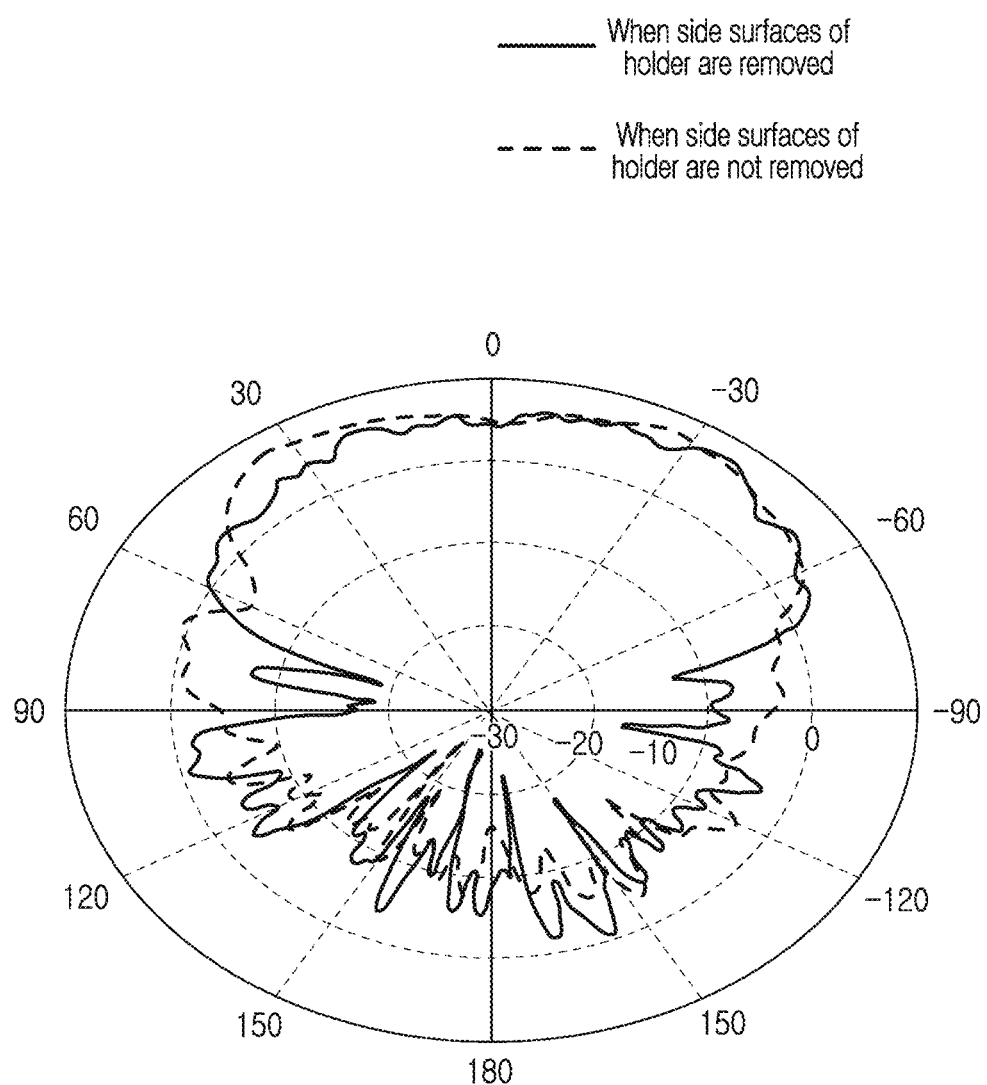
FIG. 31 is a diagram illustrating changes in horizontal beam pattern depending on whether side surfaces of a holder in accordance with the embodiment of the present disclosure are removed.

Both side surfaces of the holder 70 are removed in such a range that does not cover the radar semiconductor 24. When the side surfaces of the holder 70 are not removed, near interference occurs due to side lobe as illustrated in FIG. 31.

The side lobe indicates that some of the horizontal beam patterns of the radar semiconductor 24 are emitted in directions other than the direction of the main beam. When the side surfaces of the holder 70 are removed, side lobe waveforms having an influence on diffused reflection disappear.

As illustrated in FIGS. 32 and 33, the hook protrusion 74 protrudes from the first holder body 72 so as to be locked to the side surface of the housing 40, and thus prevents the housing 40 from separating to the outside of the holder 70. The hook protrusion 74, which serves to fix the housing 40 and the holder 70 after the housing 40 and the holder 70 are assembled, is selectively installed on any one of the holder 70 and the housing 40.

The first guide groove 76 is horizontally installed inside the first holder body 72, and formed as a groove along which the first guide protrusion 66 formed on the side surface of the housing 40 is moved.

The first fixed piece 78 is fixed to the rear surface of a vehicle bumper or a structure of the vehicle through heat fusion or ultrasonic fusion, with the housing 40 and the holder 70 assembled to each other. The first fixed piece 78 is installed in a curved shape outside the housing 40, and forms the same plane as the cover 10.

Figure 34:
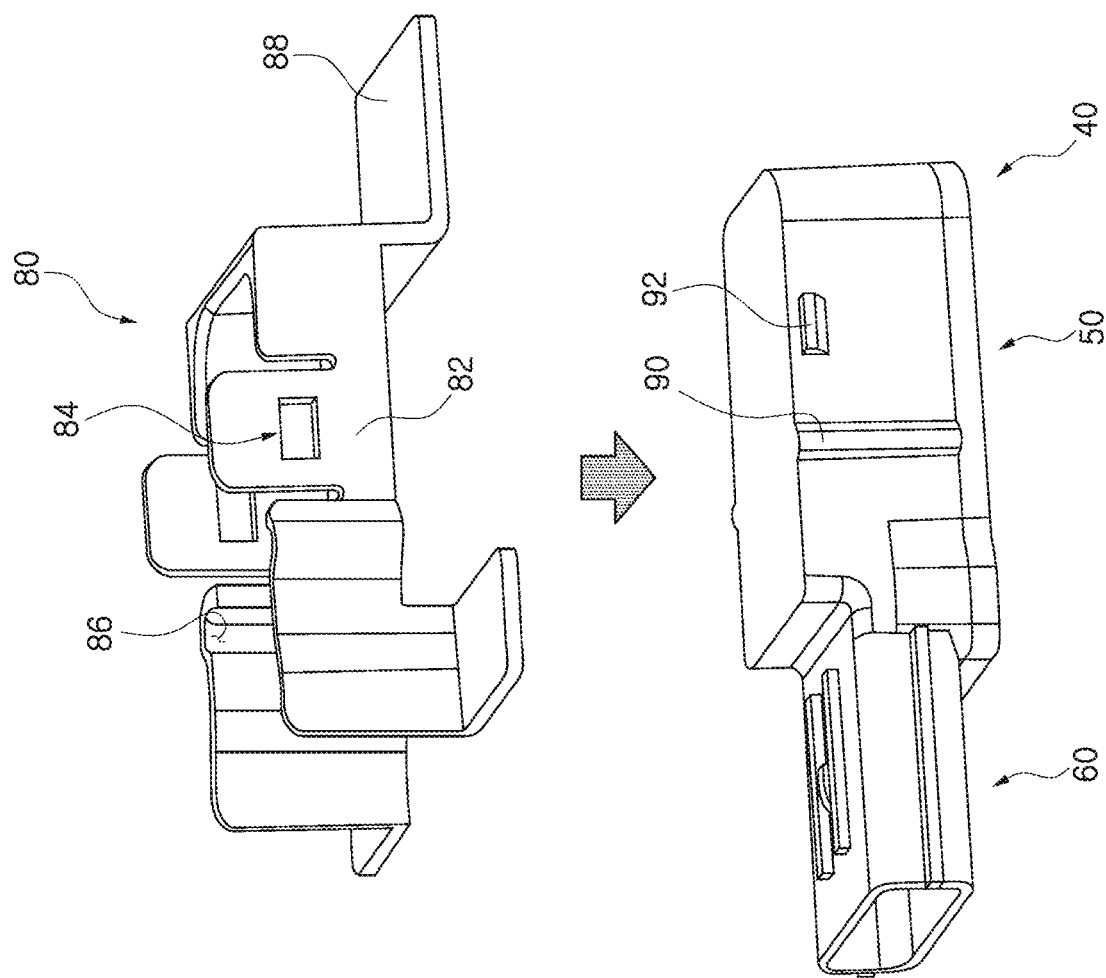
FIG. 34 is a perspective view illustrating the state in which the holder in accordance with still another embodiment of the present disclosure is separated from the housing.
Figure 35:
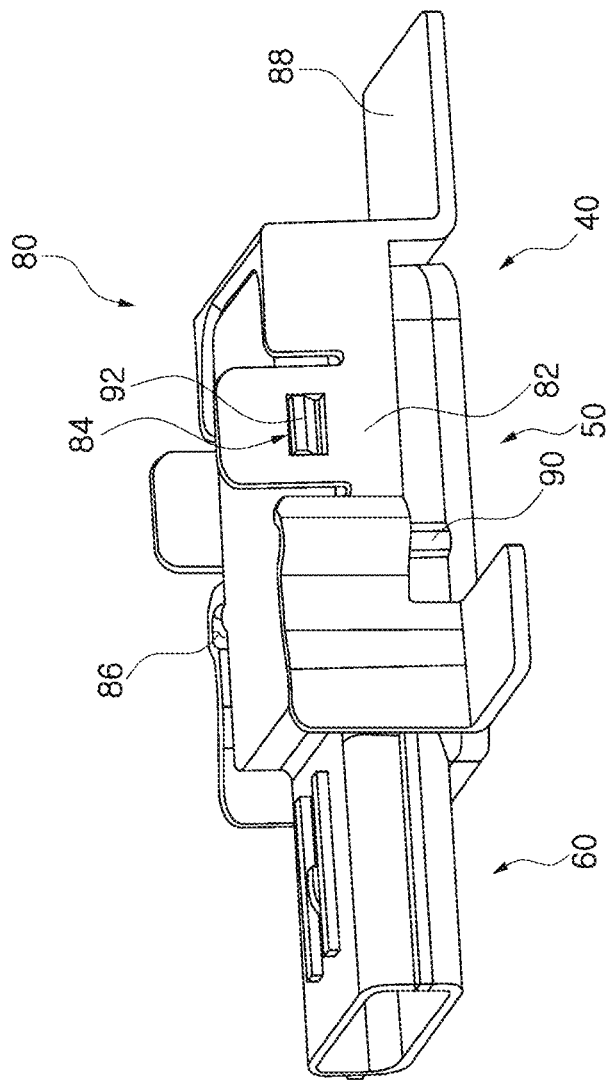
FIG. 35 is a perspective view illustrating the state in which the housing is coupled to the holder in accordance with the embodiment of the present disclosure.

FIG. 34 is a perspective view illustrating the state in which a holder in accordance with still another embodiment of the present disclosure is separated from the housing, and FIG. 35 is a perspective view illustrating the state in which the housing is coupled to the holder in accordance with the embodiment of the present disclosure.

As illustrated in FIGS. 34 and 35, the holder 80 for supporting the housing 40 includes a second holder body 82, a coupling hole 84, a second guide groove 86 and a second fixed piece 88. The housing 40 is moved downward from the top of the holder 80 and assembled and fixed to the holder 80, and rib-shaped second guide protrusions 90 are additionally formed on both sides of the housing 40 and serve as assembly guides.

The second holder body 82 is installed in a shape to cover the side surfaces of the housing 40. At this time, both side surfaces of the second holder body 82, facing the cover 10, are partially removed, and the bottom of the second holder body 82, facing the cover 10, is open.

The coupling hole 84 is formed at each of the side surfaces of the second holder body 82, facing the side surfaces of the housing 40. Therefore, a mounting protrusion 92 formed on the side surface of the housing 40 is inserted and fixed to the coupling hole 84.

The second holder body 82 has the second guide groove 86 formed therein in the top-to-bottom direction. The second guide protrusion 90 formed on the side surface of the housing 40 in the top-to-bottom direction is coupled while moved in the top-to-bottom direction along the second guide groove 86.

The second fixed piece 88 is fixed to the rear surface of the vehicle bumper or a structure of the vehicle through heat fusion or ultrasonic fusion, with the housing 40 and the holder 80 assembled to each other. The second fixed piece 88 is installed in a curved shape outside the housing 40, and forms the same plane as the cover 10.

Hereafter, the operation state of the radar sensor 1 for a vehicle in accordance with the embodiment of the present disclosure will be described in detail with reference to the accompanying drawings.

Figure 15:
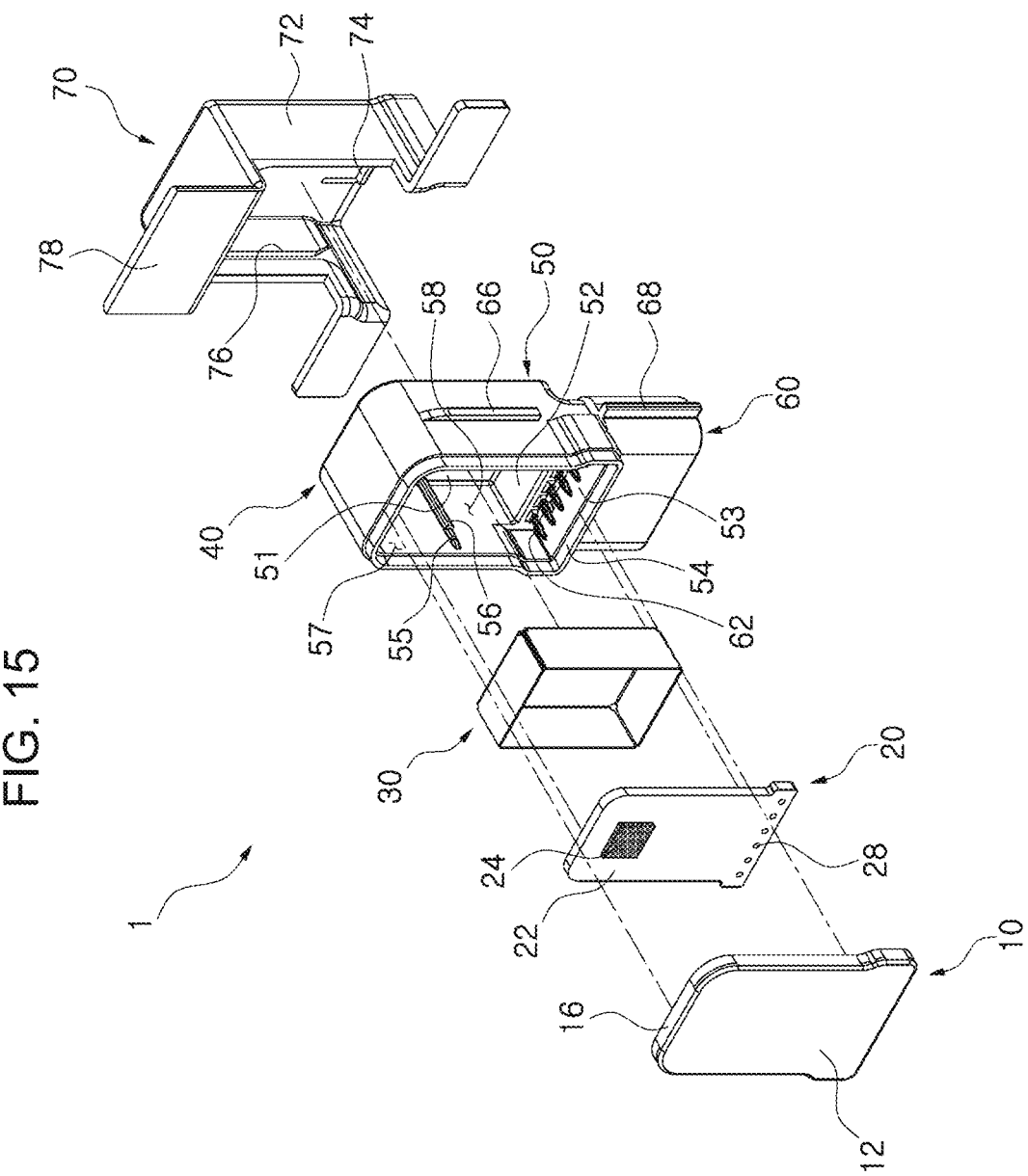
FIG. 15 is an exploded perspective view of a radar sensor for a vehicle in accordance with another embodiment of the present disclosure.
Figure 16:
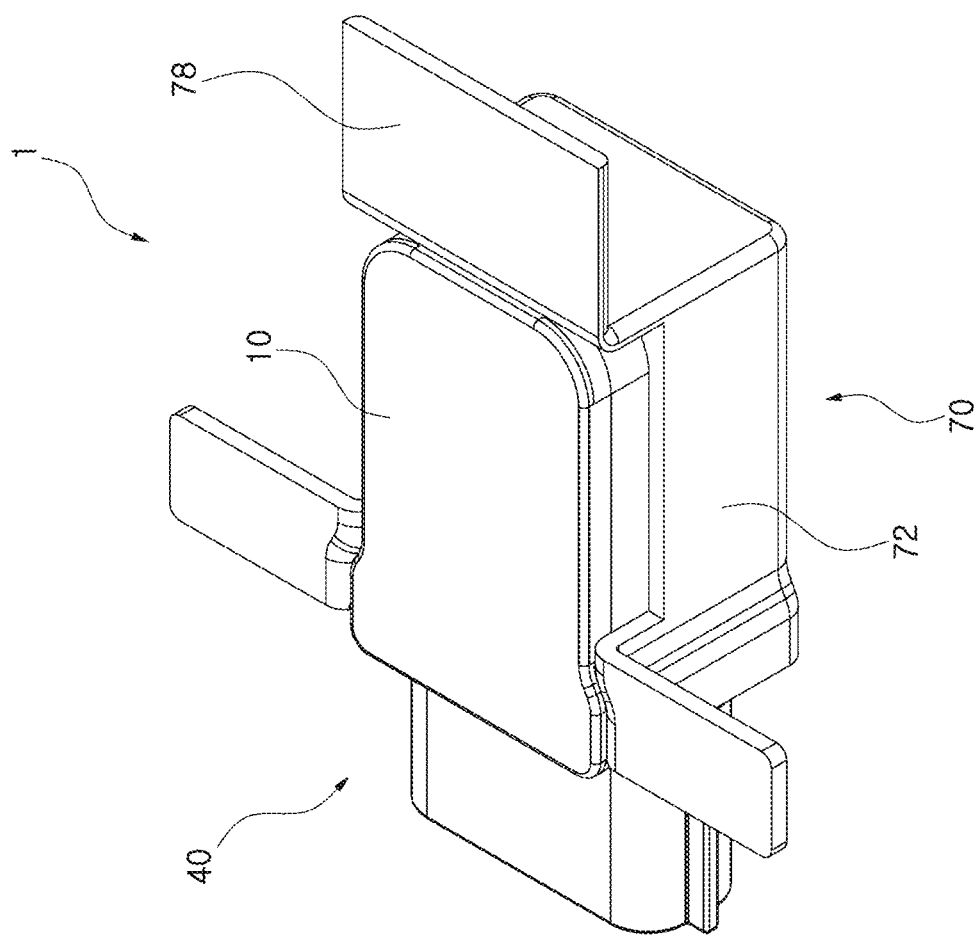
FIG. 16 is a perspective view of the radar sensor for a vehicle in accordance with the embodiment of the present disclosure.
Figure 17:
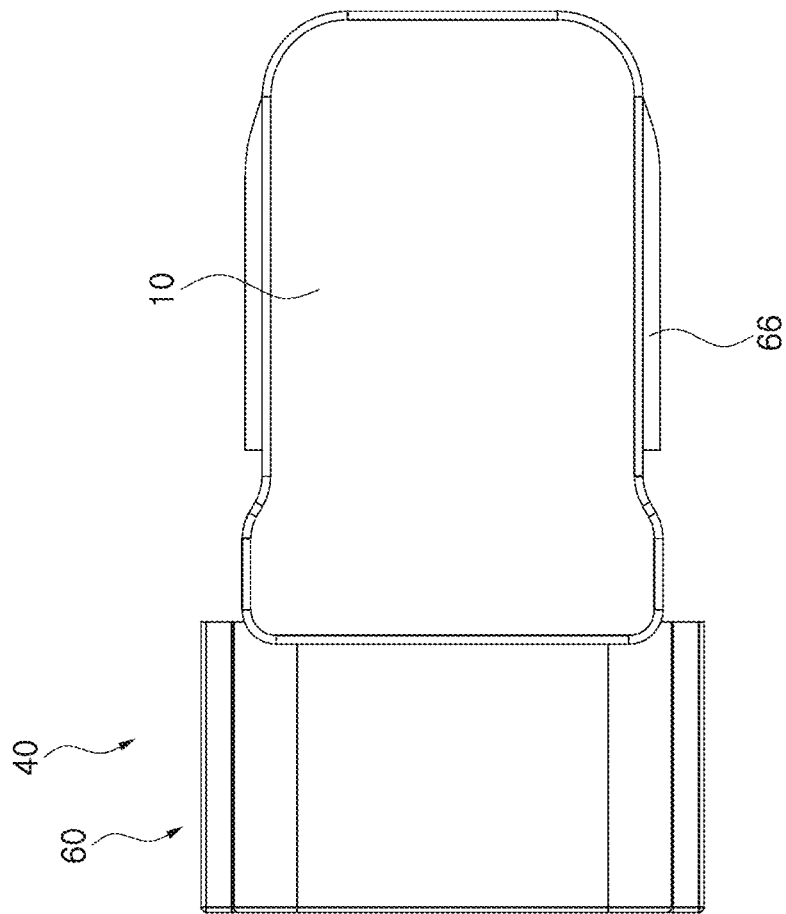
FIG. 17 is a plan view of the radar sensor for a vehicle in accordance with the embodiment of the present disclosure.
Figure 18:
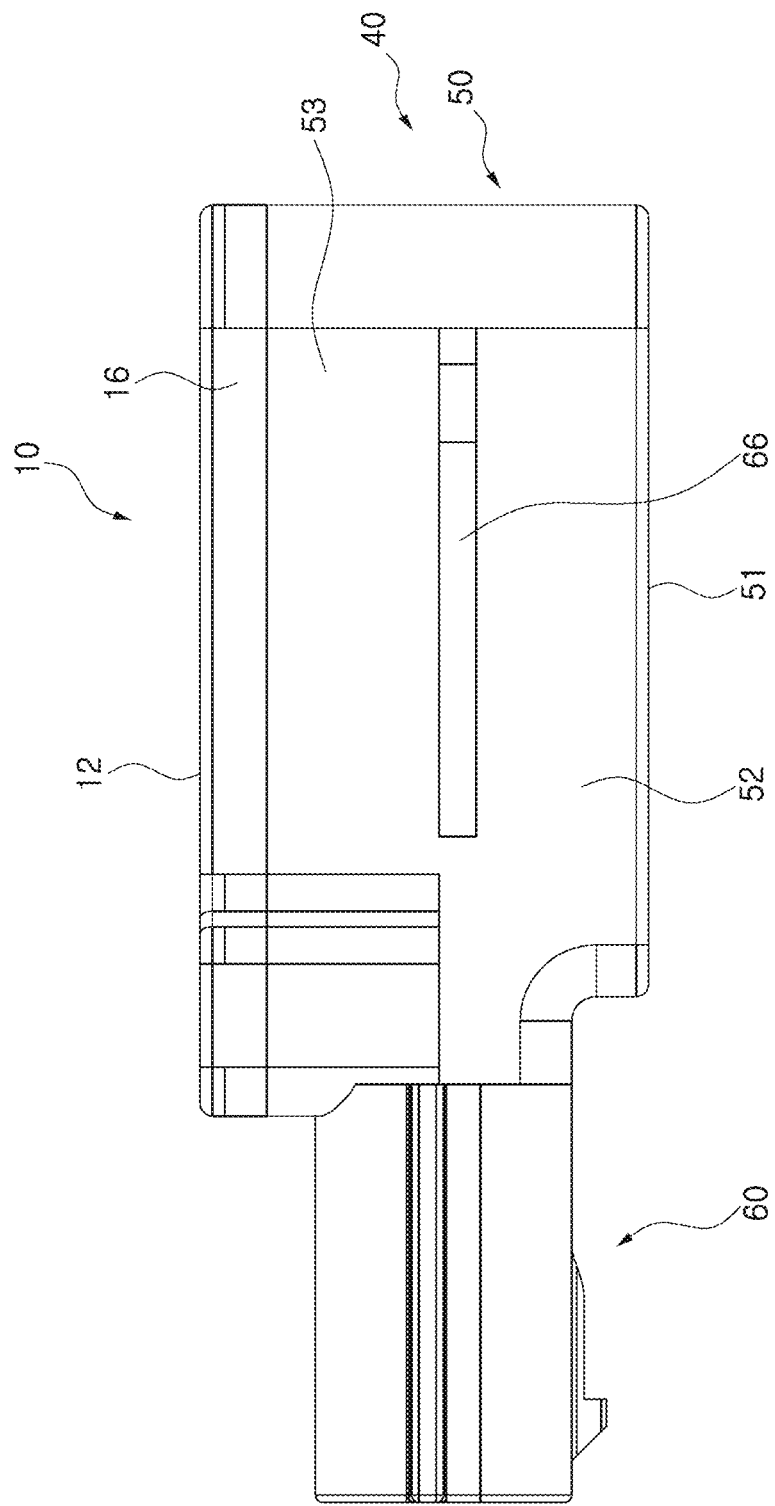
FIG. 18 is a side view of the radar sensor for a vehicle in accordance with the embodiment of the present disclosure.
Figure 19:
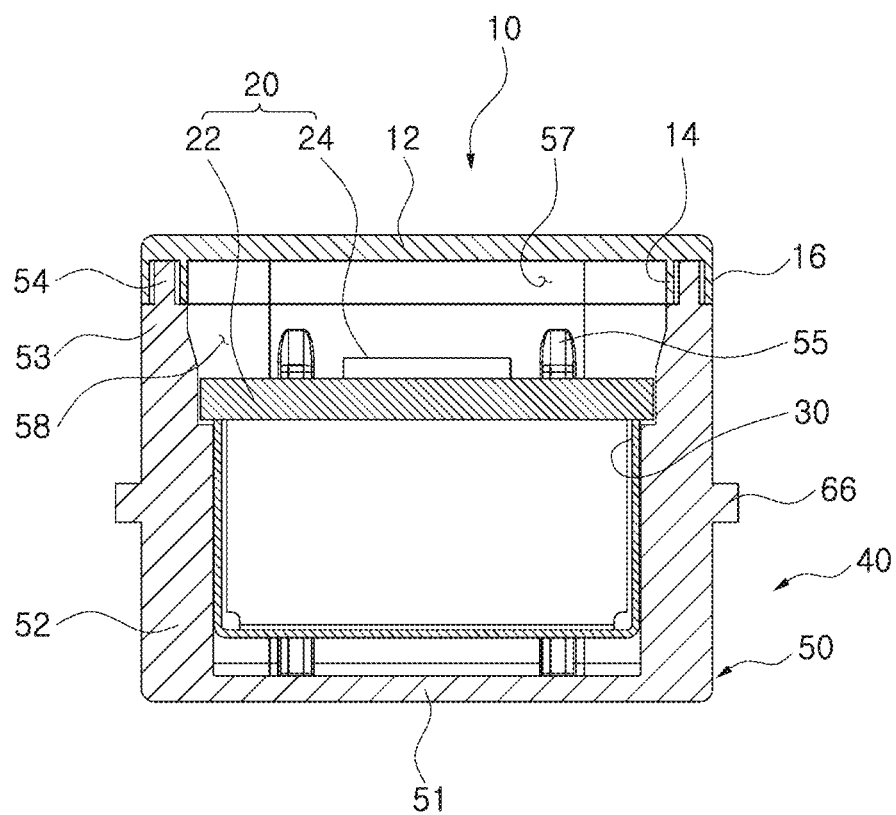
FIG. 19 is a cross-sectional view of the radar sensor for a vehicle in accordance with the embodiment of the present disclosure.
Figure 20:
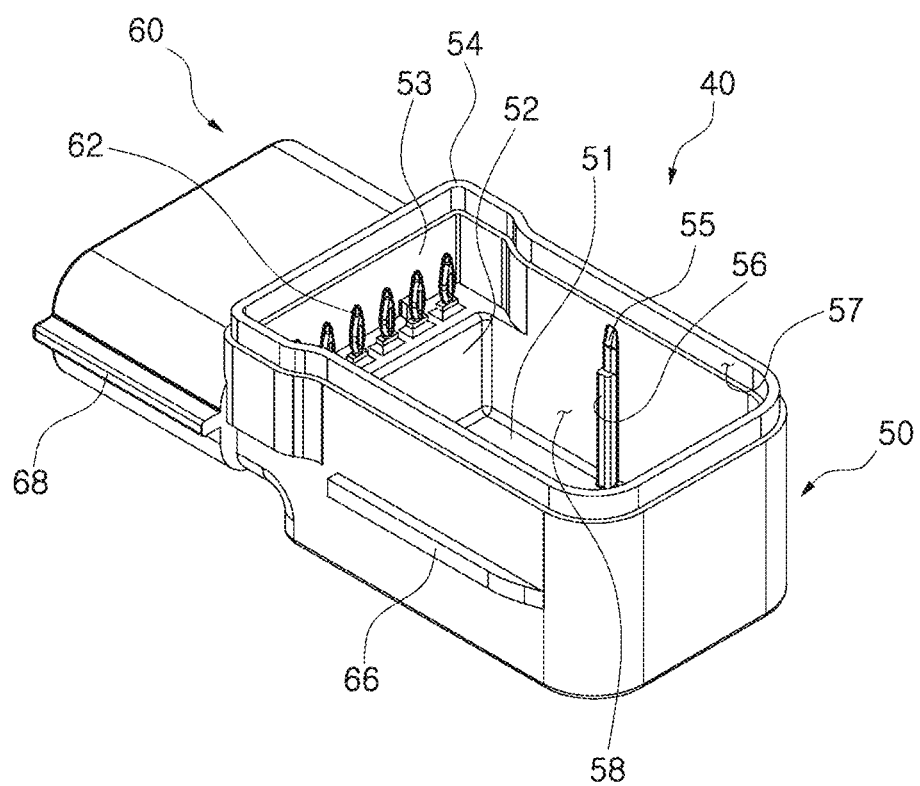
FIG. 20 is a perspective view illustrating a housing in accordance with the embodiment of the present disclosure.
Figure 21:
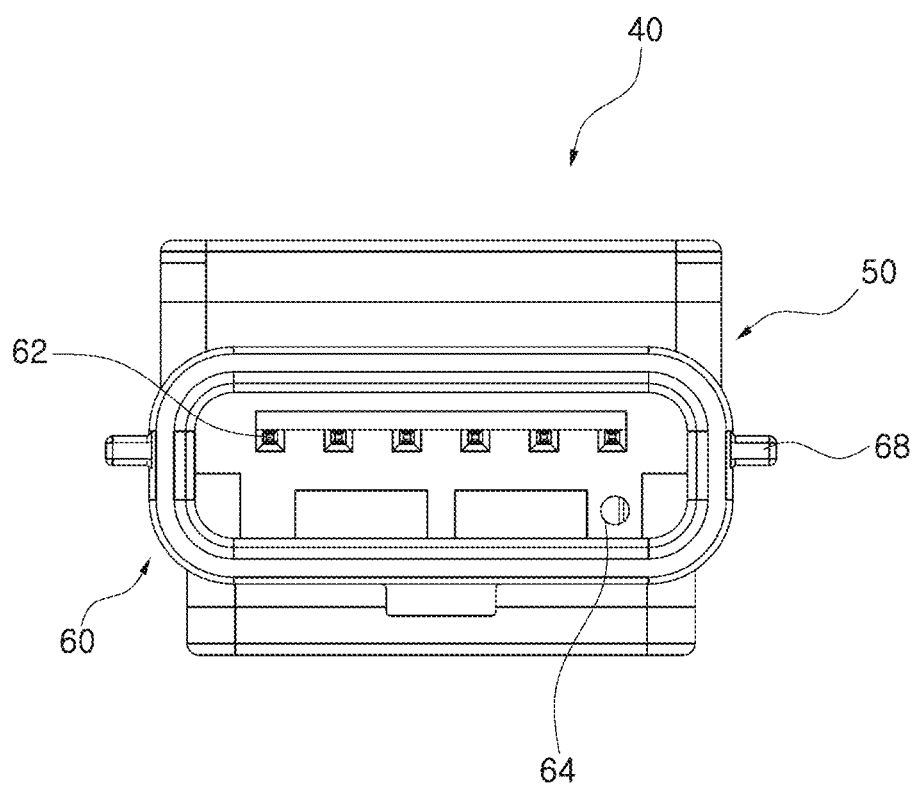
FIG. 21 is a view illustrating a connector body in accordance with the embodiment of the present disclosure.
Figure 22:
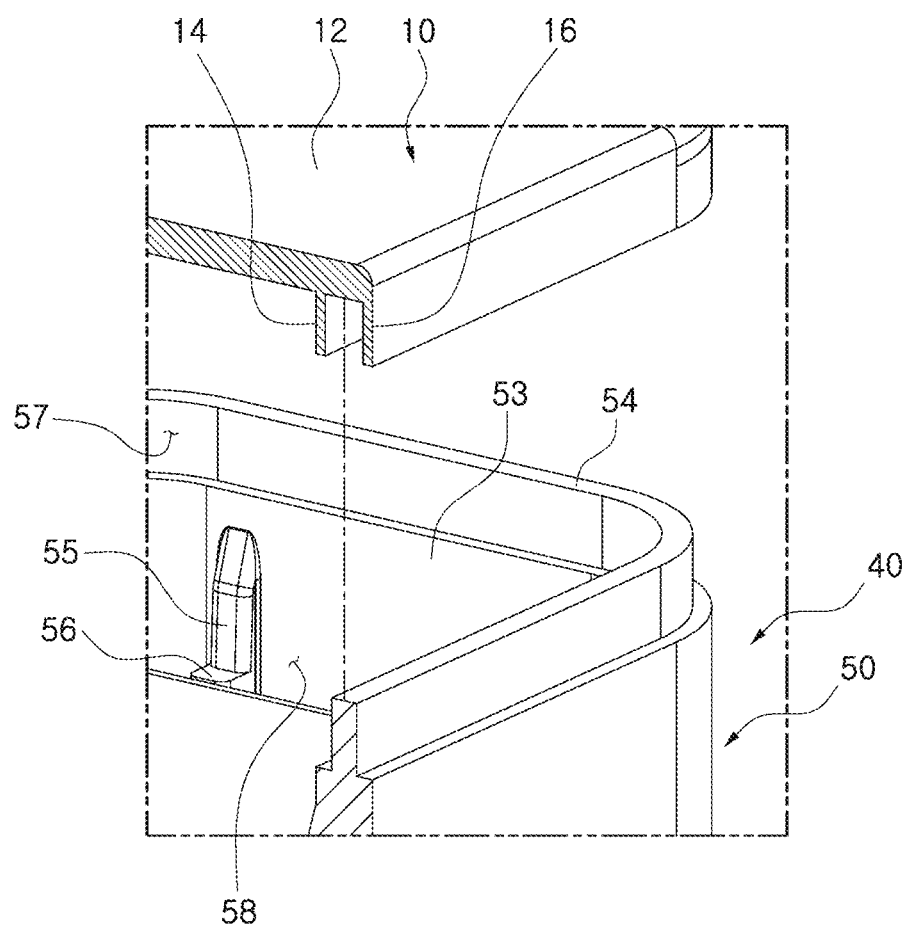
FIG. 22 is a perspective view illustrating the state in which a cover in accordance with the embodiment of the present disclosure is located above a housing body.

As illustrated in FIGS. 15 and 29, the shield case 30 is first installed in the housing 40, and the measurement unit 20 is primarily coupled to the housing 40. While the fixing holes 28 located on one side of the board 22 are placed on the connector pins 62, the other side of the board 22 is supported by the support body part 55, such that the measurement unit 20 is provisionally assembled.

When the board 22 is pressed at preset pressure by pressing equipment as illustrated in FIG. 30, assembling is completed while the one side of the board 22 abuts on the upper portion of the first sidewall part 52, and the other side of the board 22 abuts on the upper end of the side fixing part 56.

Figure 23:
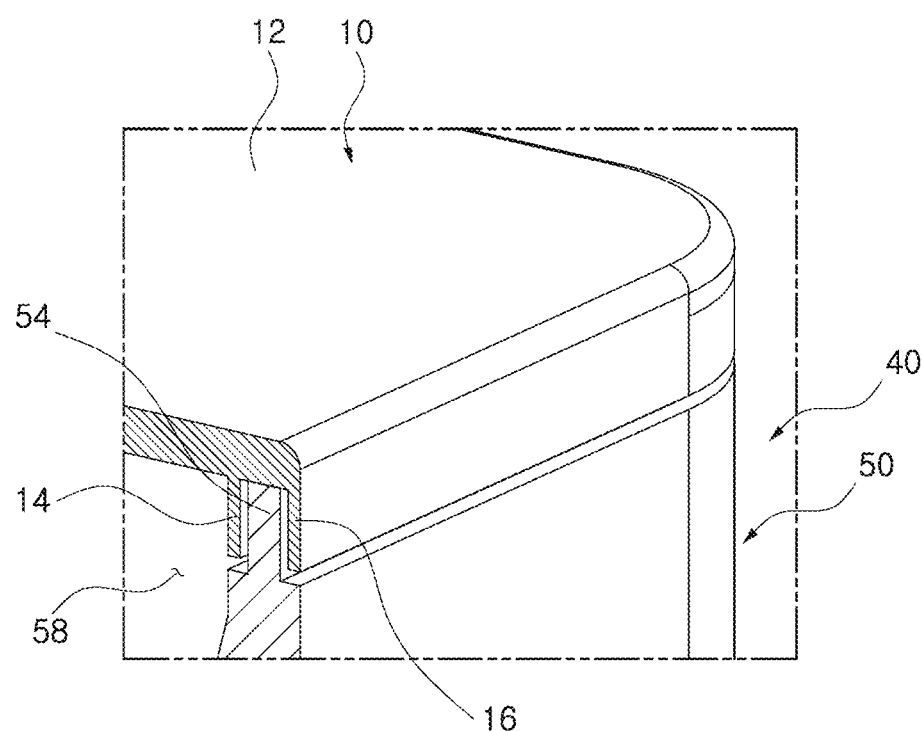
FIG. 23 is a perspective view illustrating the state in which the cover in accordance with the embodiment of the present disclosure is seated on the housing body.
Figure 24:
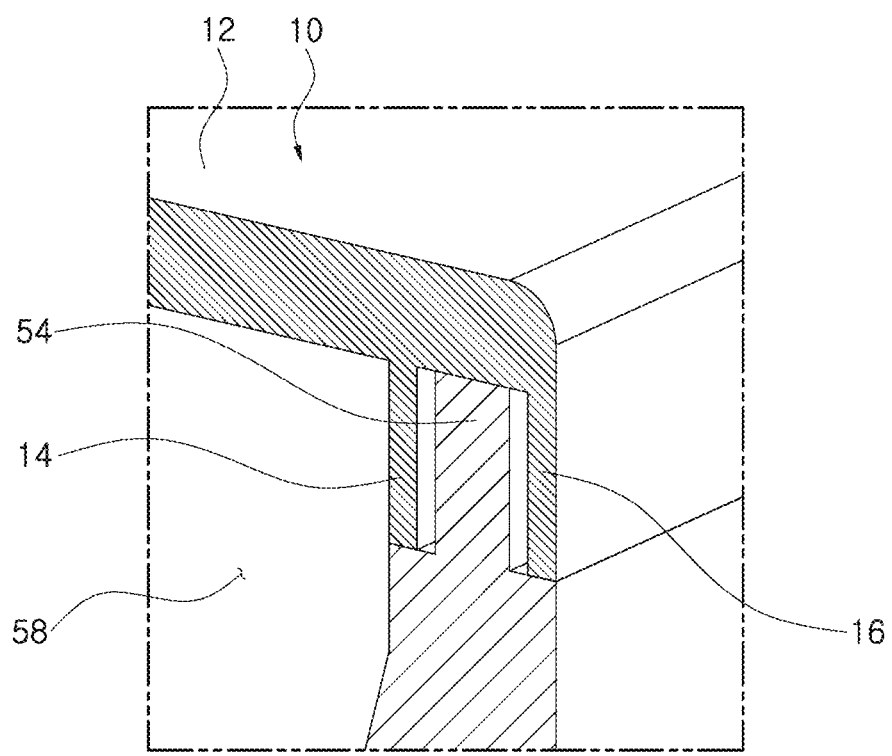
FIG. 24 is a perspective view illustrating the state in which the cover in accordance with the embodiment of the present disclosure is fixed to the housing body by laser welding.
Figure 25:
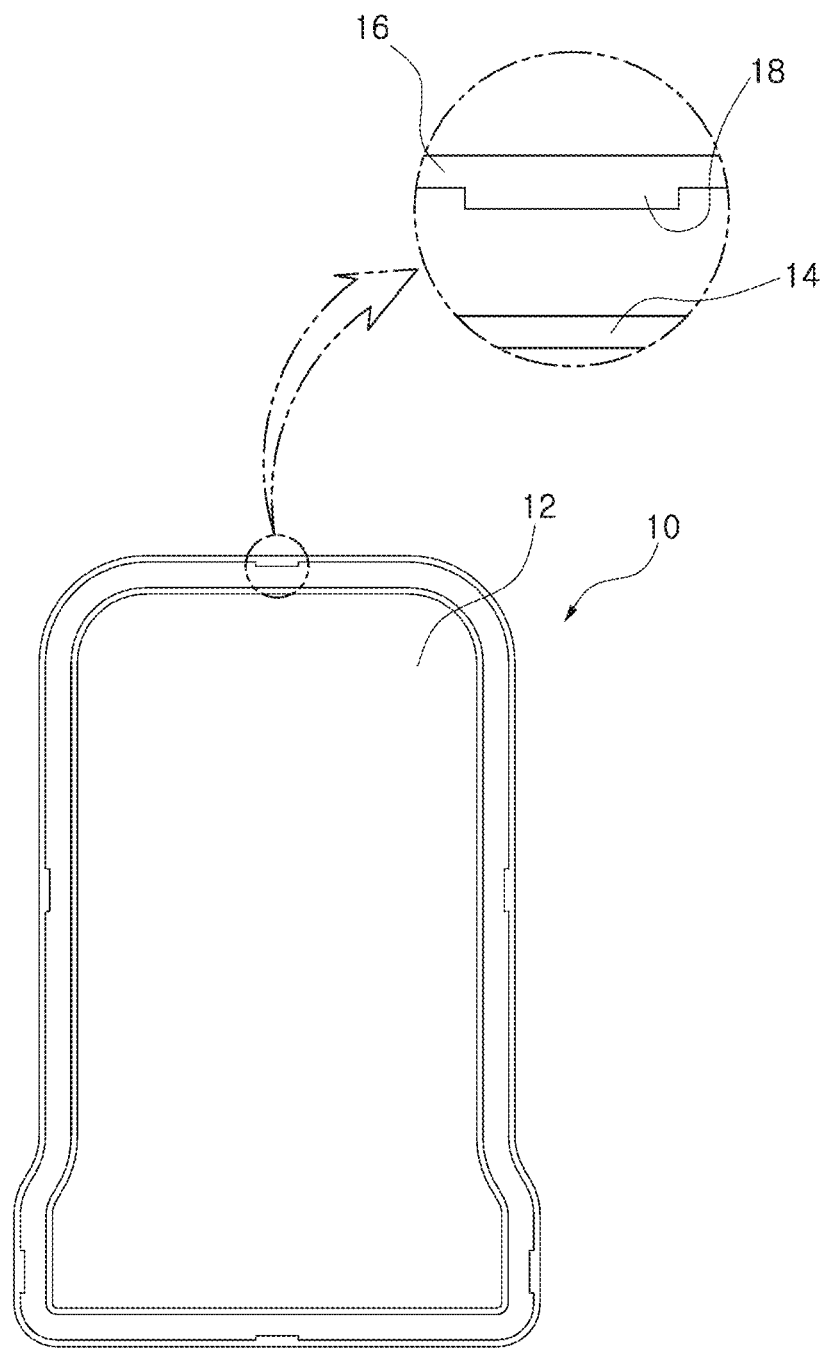
FIG. 25 is a view illustrating the cover in accordance with the embodiment of the present disclosure.
Figure 26:
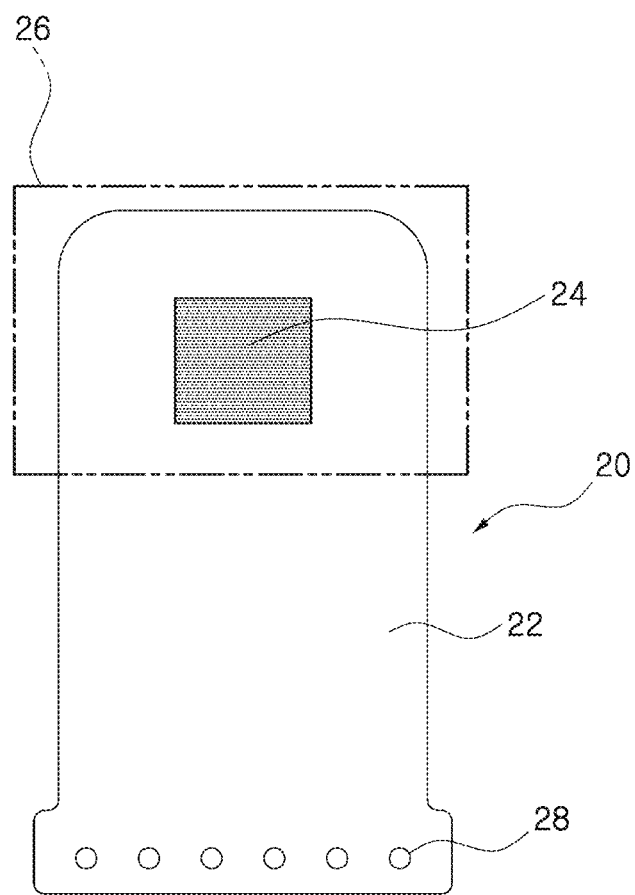
FIG. 26 is a plan view illustrating a measurement unit in accordance with the embodiment of the present disclosure.

As illustrated in FIGS. 23 to 25, the cover 10 is mounted on the top of the housing 40, and the outer member 16 and the inner member 14 are fixed in contact with the housing 40, while the length of the protrusion 54 is reduced through laser welding.

Then, an operation of coupling the holder 70 or 80 to the housing 40 and then fixing the holder 70 or 80 to the vehicle body is performed.

In accordance with the present disclosure, the radar sensor can sense an object using electromagnetic waves generated from the radar semiconductor 24, and thus improve the accuracy of the measurement, compared to ultrasonic measurement.

The sealing structure in which the cover 10 covers the entrance 57 of the housing 40 can improve the durability of the measurement unit 20. Furthermore, the board 22 is inserted onto the connector pins 62 and provisionally assembled. Then, the board 22 is brought in contact with the upper portion of the first sidewall part 52, and completely assembled. Thus, the board 22 can be stably fixed. Furthermore, since the hole for preventing an increase in internal pressure is formed in the connector body 60, the operation reliability of the radar sensor can be improved.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A radar sensor for a vehicle, comprising:
a cover configured to transmit electromagnetic waves;
a measurement unit disposed at a position facing the cover, and configured to generate the electromagnetic waves to sense an object;
a housing having an internal space in which the measurement unit is disposed, and including an open entrance at which the cover is installed;
a shield case coupled to the measurement unit; and
one or more heat conductors configured to conduct heat, generated by the measurement unit, from the shield case to the housing such that the heat is discharged to an outside of the housing.

2. The radar sensor of claim 1, wherein the one or more heat conductors comprise:
a first heat conductor member disposed between the measurement unit and the shield case, and configured to conduct the heat, generated by the measurement unit, from the shield case; and
a second heat conductor member disposed between the shield case and the housing, and configured to conduct the heat, conducted from the shield case, to the housing.

3. The radar sensor of claim 2, wherein the measurement unit comprises:
a board facing the cover, and having the first heat conductor coupled thereto; and
a radar semiconductor installed on the board, and configured to generate the electromagnetic waves to sense an object.

4. The radar sensor of claim 3, wherein the shield case comprises:
a clip coupled to a surface of the board, facing the housing; and
a shield case body fitted and coupled to the clip and having the first heat conductor member coupled to a surface thereof, facing the measurement unit.

5. The radar sensor of claim 4, wherein the housing comprises a coupling part having a coupling groove to which the second heat conductor member is coupled.

6. The radar sensor of claim 1, wherein the heat conductor comprises a curable paste material.

7. A radar sensor for a vehicle, comprising:
a cover configured to transmit electromagnetic waves;
a measurement unit installed at a position facing the cover, and configured to generate the electromagnetic waves to sense an object;
a shield case installed at a position facing the cover with the measurement unit interposed therebetween, and configured to block the electromagnetic waves generated by the measurement unit; and
a housing having an internal space in which the shield case and the measurement unit are installed, and including an open entrance at which the cover is installed,
wherein the cover comprises:
a plate-shaped cover body covering the entrance;
an inner member protruding from the cover body so as to be located inside the housing; and
an outer member protruding from the cover body so as to be located outside the housing,
wherein the housing comprises:
a housing body having the shield case and the measurement unit located therein and coupled to the cover; and
a connector body extended from the housing body and having a connector pin installed therein, wherein the housing body comprises:
a plate-shaped base part facing the measurement unit;
a first sidewall part extended from the edge of the base part and forming a space in which the shield case is seated;
a second sidewall part extended from the first sidewall part, such that the inside thereof faces the edge of the measurement unit and ends thereof face the inner member and the outer member; and
a protrusion extended from the second sidewall part and located between the inner member and the outer member.

8. The radar sensor of claim 7, wherein the measurement unit comprises:
a board fixed to the inside of the housing so as to be separated from the cover; and
a radar semiconductor installed on the board, and configured to generate the electromagnetic waves to sense an object.

9. The radar sensor of claim 8, wherein a set area in which no elements are disposed is located on one side of the board, where the radar semiconductor is located.

10. The radar sensor of claim 9, wherein the cover further comprises a movement prevention protrusion protruding from the outer member or the inner member facing the housing and abutting on the housing.

11. The radar sensor of claim 7, wherein the measurement unit is seated on the upper portion of the first sidewall part, and the connector pin has one side located in the connector body and the other side protruding upward from the first sidewall part so as to be connected to the measurement unit.

12. The radar sensor of claim 7, wherein the housing body comprises:
a support body part protruding to the inside of the first and second sidewall parts and extended in the coupling direction of the measurement unit; and
a side fixing part protruding from the support body part so as to support the bottom of the measurement unit.

13. The radar sensor of claim 7, wherein the shield case is located inside the housing, and has a shield space concave toward the measurement unit.

14. A radar sensor for a vehicle, comprising:
a cover configured to transmit electromagnetic waves;
a measurement unit installed at a position facing the cover, and configured to generate the electromagnetic waves to sense an object;
a shield case installed at a position facing the cover with the measurement unit interposed therebetween, and configured to block the electromagnetic waves generated by the measurement unit;
a housing having an internal space in which the shield case and the measurement unit are installed, and including an open entrance at which the cover is installed; and
a holder installed in a shape to cover an outside of the housing, and fixed to a vehicle body,
wherein the holder comprises:
a first holder body covering the outside of the housing; and
a hook protrusion protruding from the first holder body and locked to a side surface of the housing.

15. The radar sensor of claim 14, wherein the holder further comprises:
a second holder body installed in a shape to cover the side surface of the housing; and
a coupling hole formed at a side surface of the second holder body, facing the side surface of the housing, and a locking protrusion formed on the side surface of the housing is inserted and fixed to the coupling hole.

* * * * *